(12) United States Patent
Tobari et al.

(10) Patent No.: US 8,779,701 B2
(45) Date of Patent: Jul. 15, 2014

(54) CONTROL APPARATUS FOR PERMANENT MAGNET MOTOR

(75) Inventors: Kazuaki Tobari, Hitachiota (JP); Rikio Yoshikawa, Numazu (JP); Katsuhiro Mochizuki, Numazu (JP)

(73) Assignee: Kokusan Denki Co., Ltd., Shizuoka (JP)

( * ) Notice: Subject to any disclaimer, the term of this patent is extended or adjusted under 35 U.S.C. 154(b) by 702 days.

(21) Appl. No.: 13/029,742

(22) Filed: Feb. 17, 2011

(65) Prior Publication Data

US 2011/0241586 A1   Oct. 6, 2011

(30) Foreign Application Priority Data

Mar. 30, 2010   (JP) ................................. 2010-076564

(51) Int. Cl.
 *H02P 21/00*   (2006.01)
(52) U.S. Cl.
 USPC ................................. 318/400.02; 318/400.05
(58) Field of Classification Search
 USPC ............. 318/400.02, 400.05, 400.17, 400.39, 318/629, 632
 See application file for complete search history.

(56) References Cited

U.S. PATENT DOCUMENTS

| | | | | |
|---|---|---|---|---|
| 7,161,323 B2 * | 1/2007 | Ajima et al. | ................... | 318/629 |
| 7,221,887 B2 * | 5/2007 | Kimura et al. | ................ | 399/101 |
| 7,521,887 B2 * | 4/2009 | Tobari et al. | ................... | 318/717 |
| 7,528,568 B2 * | 5/2009 | Tobari et al. | ................... | 318/723 |
| 7,719,226 B2 * | 5/2010 | Tobari et al. | ................... | 318/807 |
| 7,746,023 B2 * | 6/2010 | Ajima et al. | ................... | 318/700 |

FOREIGN PATENT DOCUMENTS

| | | |
|---|---|---|
| JP | 2004-201487 | 7/2004 |
| JP | 2010-057217 | 3/2010 |

\* cited by examiner

*Primary Examiner* — Rina Duda

(74) *Attorney, Agent, or Firm* — Antonelli, Terry, Stout & Kraus, LLP.

(57) ABSTRACT

A sinusoidal signal is superimposed on a current command value of a q-axis (torque shaft) supplied from a host, and according to the resulting current command value, the output voltage of a power converter is controlled. For the calculation of the superimposed signal added to the current command value of the q-axis, with the use of the ripple component information of induced voltage coefficients of the d-axis and q-axis of the rotating coordinate system of a permanent magnet motor, the current command values of the d-axis and q-axis, an average value of induced voltage coefficients of the d-axis, and inductance values of the d-axis and q-axis, the sinusoidal superimposed signal is calculated and added to the above-described current command value of the q-axis.

12 Claims, 15 Drawing Sheets

CONTROL APPARATUS FOR PERMANENT MAGNET MOTOR

BACKGROUND OF THE INVENTION

The present invention relates to a torque control apparatus for a permanent magnet motor, and in particular relates to the control apparatus for a permanent magnet motor capable of suppressing a torque ripple when there is a reluctance torque and there is an induced voltage distortion in an induced voltage waveform and thereby realizing an accurate torque control.

As the method of suppressing a torque ripple when the induced voltage of a magnet motor has a square waveform (the induced voltage distortion), there is known a method comprising the steps of converting a three-phase induced voltage waveform into a voltage $e_d$ of a d-axis and a voltage $e_q$ of a q-axis and calculating a current command value $I_{qref}$ of the q-axis (canceling the torque ripple) according to Formula (1), as in the description of JPA-2004-201487.

$$I_{qref} = \frac{2}{3}\left(T_{ref} \times \frac{\omega_m}{e_q}\right) \quad (1)$$

Where
$T_{ref}$: a torque command value, and
$\omega_m$: the mechanical angle velocity of a motor.

That is, even if the induced voltage waveform of a magnet motor is a square waveform, the current command value $I_{qref}$ of the q-axis containing a ripple waveform is calculated so as to set the output torque to be constant.

If vector control is performed according to this current command value, the torque ripple can be suppressed.

Formula (2) is the output torque formula of a magnet motor.

$$\tau_m = \frac{3}{2} \cdot P_m \cdot [K_{ed} \cdot I_q - K_{eq} \cdot I_d + (L_d - L_q)I_d \cdot I_q] \quad (2)$$

Where
$P_m$: the number of pole pairs of a motor,
$K_{ed}$: the induced voltage coefficient of the d-axis,
$K_{eq}$: the induced voltage coefficient of the q-axis,
$I_d$: the current of the d-axis,
$I_q$: the current of the q-axis,
$L_d$: the inductance value of the d-axis, and
$L_q$: the inductance value of the q-axis.

The method described in JP-A-2004-201487 is a technique corresponding to a non-salient pole type ($L_d=L_q$) magnet motor with no reluctance torque, wherein the "induced voltage coefficients $K_{ed}$, $K_{eq}$" are distorted. Therefore, this method cannot be directly applied to the salient pole type ($L_d<L_q$) magnet motor.

SUMMARY OF THE INVENTION

In the method described in JP-A-2004-201487, the control is performed so as to cancel the torque ripple component which is generated when the induced voltage waveform is a square waveform. With regard to the output torque, the above method comprises the step of controlling so as to set the component $(K_{ed} \bullet I_q - K_{eq} \bullet I_d)$ in Formula (2) to zero, but does not take into consideration the case where there is the $(L_d - L_q) I_d \bullet I_q$ component.

In contrast, the purpose of the present invention is to provide a control apparatus for a magnet motor capable of arbitrarily controlling in a predetermined relationship the "ripple component" and "DC component" of the torque ripple in the salient pole type ($L_d<L_q$) magnet motor.

In order to solve the above-described problems, according to a first aspect of the present invention, a control apparatus for a permanent magnet motor, comprising a power converter which drives the permanent magnet motor and controlling an output of the power converter, performs the steps of calculating a sinusoidal superimposed signal with the use of an induced voltage coefficient of the permanent magnet motor and information about an inductance; adding the superimposed signal to a current command value and controlling the output voltage of the power converter; and controlling the values of a DC torque component and ripple torque component of the permanent magnet motor.

Moreover, in order to solve the above-described problems, according to a second aspect of the present invention, a control apparatus for a permanent magnet motor, comprising a power converter which drives the permanent magnet motor and controlling an output of the power converter, performs the steps of: calculating a sinusoidal superimposed signal with the use of ripple components of an induced voltage coefficient of a d-axis and q-axis of the permanent magnet motor, inductances of the d-axis and q-axis, and current command values of the d-axis and q-axis; adding the superimposed signal to the current command value of the q-axis and controlling the output voltage of the power converter; and controlling the values of a DC torque component and ripple torque component of the permanent magnet motor.

Moreover, in the control apparatus for a permanent magnet motor of the second aspect of the present invention, the calculation of the sinusoidal superimposed signal is performed using a ripple component of an induced voltage coefficient of at least one of the d-axis and q-axis of a rotating coordinate system, a current command value of the other axis, an average value of induced voltage coefficients of the d-axis, inductance values of the d-axis and q-axis, and a current command value of the d-axis.

Moreover, in the control apparatus for a permanent magnet motor of the second aspect of the present invention, the superimposed signal added to the current command value of the q-axis is obtained by setting an arbitrary n in the following calculation formula.

$$\Delta I_q^* = \sum_{n=1}^{\infty}\left(\frac{-\Delta K_{ed}}{\overline{K_{ed}} + (L_d - L_q) \cdot I_{d0}^*}\right)^n \cdot I_{q0}^* - \sum_{n=1}^{\infty}\left(\frac{-\Delta K_{eq}}{\overline{K_{ed}} + (L_d - L_q) \cdot I_{d0}^*}\right)^n \cdot I_{d0}^*$$

Where
n: an integer,
$\Delta K_{ed}$: the "ripple component" of the induced voltage coefficient of the d-axis,
$\Delta K_{eq}$: the "ripple component" of the induced voltage coefficient of the q-axis,
$\overline{K_{ed}}$: the "DC component" of the induced voltage coefficient of the d-axis,
$I_{d0}^*$: a torque command value or a current command value of the d-axis supplied from a host, and
$I_{q0}^*$: a torque command value or a current command value of the q-axis supplied from the host Furthermore, in the control apparatus for a permanent magnet motor of the second aspect of the present invention, the ripple component is a signal which varies with a motor position.

Moreover, in order to solve the above-described problems, according to a third aspect of the present invention, a control apparatus for a permanent magnet motor, comprising a power converter which drives the permanent magnet motor and controlling an output of the power converter, performs the steps of calculating a sinusoidal superimposed signal with the use of information about an induced voltage coefficient of a stator coordinate system of the permanent magnet motor and an inductance value; adding the superimposed signal to a three-phase current command value of the stator coordinate system and controlling the output voltage of the power converter; and controlling the values of a DC torque component and ripple torque component of the permanent magnet motor.

Moreover, in order to solve the above-described problems, according to a fourth aspect of the present invention, a control apparatus for a permanent magnet motor, comprising a power converter which drives the permanent magnet motor and controlling an output of the power converter, performs the steps of: estimating the output torque of the permanent magnet motor with the use of information about a voltage and current of the power converter which drives the permanent magnet motor; adding a sinusoidal superimposed signal, which is calculated using a deviation from the torque command value supplied from the host, to the current command value of the q-axis; controlling the output voltage of the power converter; and controlling the values of a DC torque component and ripple torque component of the permanent magnet motor.

Furthermore, in the control apparatus for a permanent magnet motor according to the fourth aspect of the present invention, the method of estimating the output torque of the permanent magnet motor comprises the step of subtracting a copper loss component and a transitional component from effective power information of the power converter.

Furthermore, in the control apparatus for a permanent magnet motor according to the fourth aspect of the present invention, the output torque estimation of the permanent magnet motor is performed according to the following calculation formula.

$$\tau^\wedge = \frac{(V_{dc}^* \cdot I_{dc} + V_{qc}^* \cdot I_{qc}) - R \cdot (I_{dc}^2 + I_{qc}^2) - (L_d \cdot I_{dc}^2 + L_q \cdot I_{qc}^2) \cdot s}{\omega} \cdot \frac{3}{2} \cdot P_m$$

Where
n: an integer,
$V_{dc}^*$: a voltage command value of the d-axis,
$I_{dc}$: a current detection value of the d-axis,
$V_{qc}^*$: a voltage command value of the q-axis,
$I_{qc}$: a current detection value of the q-axis,
$L_d$: an inductance value of the d-axis,
$L_q$: an inductance value of the q-axis,
$\omega$: an electrical angular velocity of the magnet motor,
Pm: the number of pole pairs, and
s: Laplace operator.

Furthermore, in the control apparatus for a permanent magnet motor according to the fourth aspect of the present invention, the calculation of the sinusoidal superimposed signal added to the current command value of the q-axis comprises the steps of: calculating a torque deviation between an estimated output torque of the permanent magnet motor and a torque command value supplied from a host, preparing a sine (sin) signal and a cosine (cos) signal with the use of the largest each frequency component contained in a torque estimation value in one period of electric angle of a position detection value, performing a proportional/integral calculation with the use of the cosine (cos) signal and the torque deviation (or the torque estimation value); multiplying the resulting calculation value again by the cosine (cos) signal (this calculation result is referred to as a first calculation result), performing a proportional/integral calculation with the use of the sine (sin) signal and the torque deviation (or the torque estimation value); multiplying the resulting calculation value again by the sine (sin) signal (this calculation result is referred to as a second calculation result); and adding a value, which is obtained by doubling an added value of the first calculation result and the second calculation result, to the current command value of the q-axis supplied from the host.

Furthermore, the control apparatus for a permanent magnet motor according to the fourth aspect of the present invention performs the steps of setting a plurality of angular frequency components contained in the torque estimation value; preparing a plurality of sine (sin) signals and cosine (cos) signals; performing a proportional/integral calculation with the use of the plurality of cosine (cos) signals and torque deviations (or torque estimation values), respectively; multiplying each resulting calculation value again by the plurality of cosine (cos) signals (this calculation result is referred to as a third calculation result); performing a proportional/integral calculation with the use of the plurality of sine (sin) signals and the torque deviations (or the torque estimation value), respectively; multiplying the resulting calculation value again by the plurality of sine (sin) signals (this calculation result is referred to as a fourth calculation result); and adding a value, which is obtained by doubling an added value of the third calculation result and the fourth calculation result, to the current command value of the q-axis supplied from the host.

Furthermore, the control apparatus for a permanent magnet motor according to the first aspect of the present invention performs, as the method of suppressing a torque ripple, the method of suppressing a torque ripple of the second aspect of the present invention.

Furthermore, according to a fifth aspect of the present invention, an electric power steering control apparatus includes the control apparatus for a permanent magnet motor according to the first aspect of the present invention.

Furthermore, in the control apparatus for a permanent magnet motor according to the first aspect of the present invention, for the ripple frequency of a torque ripple, the DC torque component increases by a magnitude of a half the ripple torque component of the 12th order harmonic component.

Furthermore, in the control apparatus for a permanent magnet motor according to the first aspect of the present invention, by arbitrarily setting a magnitude of the current value of the d-axis, the "ripple torque component of the 12th order harmonic component" and the "DC torque component which increases more than the torque command value" have a relationship as expressed by the following formulas.

Ripple Torque Component:

$$\Delta \tau_m \approx \frac{3}{2} \cdot P_m \cdot \left[ \frac{1}{2} \cdot (\cos[12\theta] - \sin[12\theta]) \cdot \frac{\overline{I_d} \cdot \overline{K_{ed}^2}}{\overline{K_{ed}} + (L_d - L_q) \cdot \overline{I_d}} \right]$$

DC Torque Component:

$$\overline{\Delta \tau_m} \approx \frac{3}{2} \cdot P_m \cdot \left[ -\frac{1}{2} \cdot \frac{\overline{I_d} \cdot \overline{K_{ed}^2}}{\overline{K_{ed}} + (L_d - L_q) \cdot \overline{I_d}} \right]$$

According to the present invention, in a control apparatus for a permanent magnet motor, the torque ripple of the magnet motor wherein there is a reluctance torque is suppressed. Moreover, the "ripple component" and "DC component" of the torque ripple can be arbitrarily controlled in a predetermined relationship, and accurate torque control characteristics can be realized.

Other objects, features and advantages of the invention will become apparent from the following description of the embodiments of the invention taken in conjunction with the accompanying drawings.

DETAILED DESCRIPTION OF THE INVENTION

Hereinafter, the embodiments of the present invention will be described in detail with reference to the accompanying drawings.

First Embodiment

Figure 1:
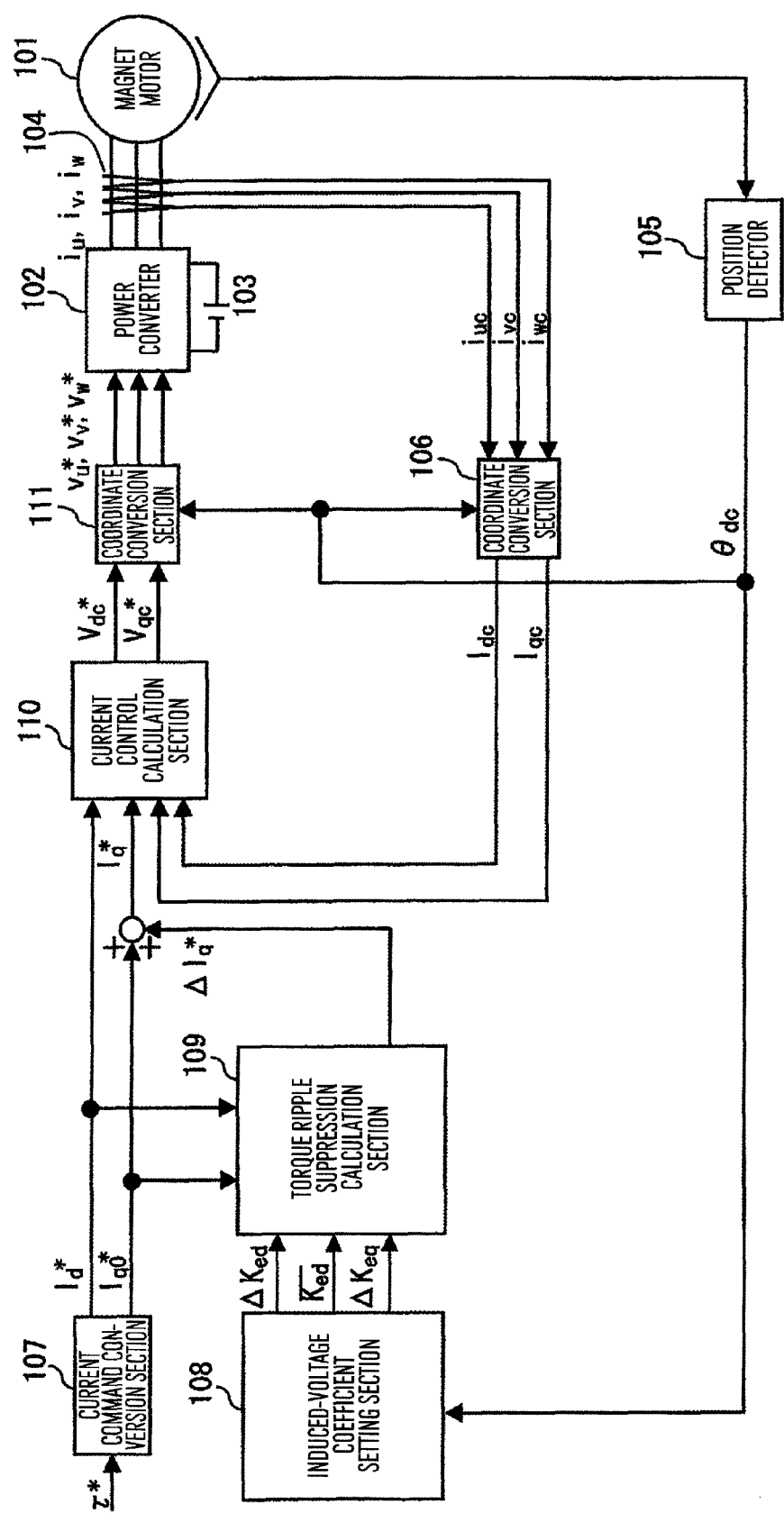
FIG. 1 illustrates a block diagram of a control apparatus for a permanent magnet motor according to one embodiment of the present invention.

FIG. 1 illustrates a configuration example of a control apparatus for a permanent magnet motor according to one embodiment of the present invention.

A magnet motor 101 outputs a combined torque of a magnetic flux torque component of the magnetic flux of a permanent magnet and a reluctance torque component of the inductance of an armature coil.

A power converter 102 outputs the voltages proportional to three-phase AC voltage command values $V_u^*$, $V_v^*$, $V_w^*$ and varies the output voltage and rotational speed of the magnet motor 101.

ADC power supply 103 supplies a DC voltage to the power converter 102.

A current detection section 104 detects three-phase AC currents $i_u$, $i_v$, $i_w$ flowing into the magnet motor 101, and outputs current detection values $i_{uc}$, $i_{vc}$, $i_{wc}$.

A position sensor 105 is a resolver or encoder capable of detecting a position θ of the motor, and outputs a position detection value $θ_{dc}$.

A coordinate conversion section 106 calculates current detection values $I_{dc}$ and $I_{qc}$ of a d-axis and q-axis using the three-phase AC current detection values $i_{uc}$, $i_{vc}$, $i_{wc}$ and the position detection value $θ_{dc}$, and outputs the same.

A current command conversion section 107 calculates current command values $I_d^*$ and $I_{qo}^*$ of the d-axis and q-axis from a torque command value τ* and outputs the same.

An induced-voltage coefficient setting section 108 receives the position detection value $θ_{dc}$, and outputs information signals $ΔK_{ed}$, $\overline{K_{ed}}$, $ΔK_{eq}$ of the induced voltage coefficient.

A torque ripple suppression calculation section 109 outputs a ripple current command value $ΔI_q^*$ of the q-axis according to a calculation formula.

A current control calculation section 110 performs a proportional/integral calculation so that the current detection values $I_{dc}$ and $I_{qc}$ of the d-axis and q-axis may follow new current command values ($I_d^*$, $I_q^*$), which are obtained by adding a current correction command value $ΔI_q^*$ of the torque ripple suppression calculation section 109 to the current command values ($I_d^*$, $I_{qo}^*$) of the d-axis and q-axis (i.e., the outputs of the current command conversion section 107), and outputs voltage command values $V_{dc}^*$ and $V_{qc}^*$ of the d-axis and q-axis.

A coordinate conversion section 111 outputs three-phase AC voltage command values $V_u^*$, $V_v^*$, $V_w^*$ using the voltage command values $V_{dc}^*$ and $V_{qc}^*$ of the d-axis and q-axis and the position detection value $θ_{dc}$.

First, the basic operation of the voltage control and phase control of the vector control method is described.

Figure 2:
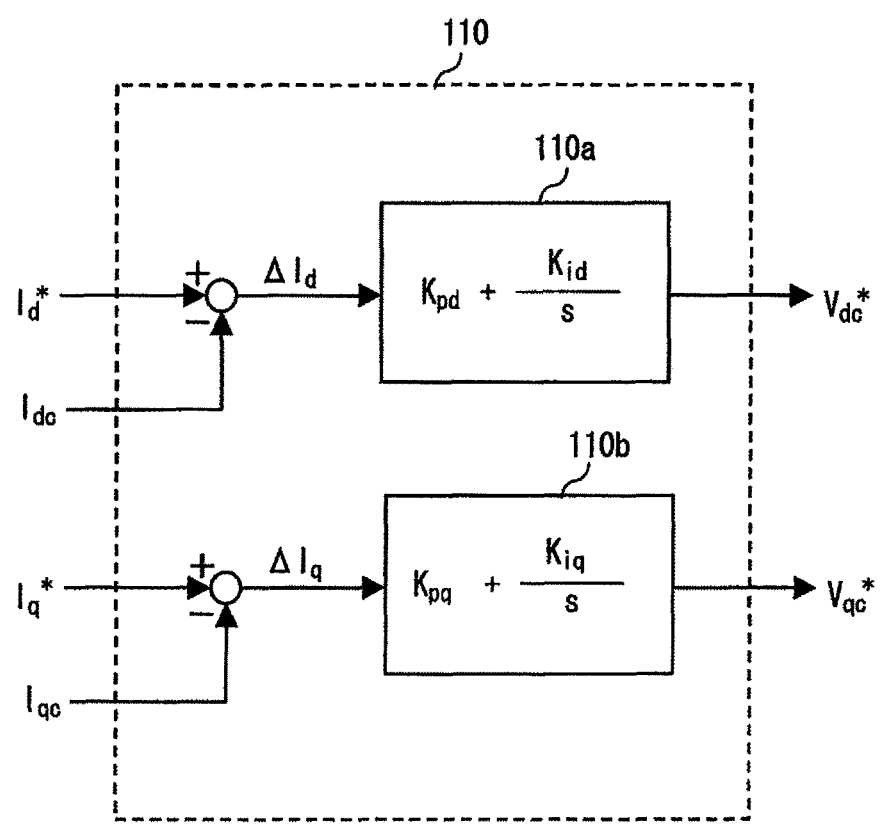
FIG. 2 illustrates a block diagram of a current control calculation section.

With regard to the basic operation of the voltage control, the configuration of the current control calculation section is illustrated in FIG. 2.

In FIG. 2, the current command value $I_d^*$ and current detection value $I_{dc}$ of the d-axis are input to a current control calculation section 110a of the d-axis, and the current command value $1_q^*$ and current detection value $I_{qc}$ of the q-axis are input to a current control calculation section 110b of the q-axis. Here, the proportional/integral calculation is performed according to Formula (3) so that the current detection values $I_{dc}$ and $I_{qc}$ of the d-axis and q-axis may follow the current command values $I_d^*$, $I_q^*$, and then the voltage command values $V_{dc}^*$ and $V_{qc}^*$ of the d-axis and q-axis are output.

$$\begin{cases} V_{dc}^* = (I_d^* - I_{dc}) \cdot \left(K_{pd} + \dfrac{K_{id}}{s}\right) \\ V_{qc}^* = (I_q^* - I_{qc}) \cdot \left(K_{pq} + \dfrac{K_{iq}}{s}\right) \end{cases} \quad (3)$$

Where
$K_{pd}$: the proportional gain of d-axis current control,
$K_{id}$: the integration gain of the d-axis current control,
$K_{pq}$: the proportional gain of q-axis current control, and $K_{iq}$: the integration gain of the q-axis current control.

On the other hand, in the phase control, in the position sensor 105, such as a resolver, an encoder, or a magnetic pole position detector, of FIG. 1, the position θ of the motor is detected and the position detection value $\theta_{dc}$ is obtained. In the coordinate conversion sections 106, 111, the coordinate conversion illustrated in Formula (4) and Formula (5) is performed using the position detection value $\theta_{dc}$.

$$\begin{bmatrix} v_u^* \\ v_v^* \\ v_w^* \end{bmatrix} = \begin{bmatrix} 1 & 0 \\ 1/2 & \sqrt{3}/2 \\ -1/2 & -\sqrt{3}/2 \end{bmatrix} \cdot \begin{bmatrix} \cos(\theta_{dc}) & -\sin(\theta_{dc}) \\ \sin(\theta_{dc}) & \cos(\theta_{dc}) \end{bmatrix} \begin{bmatrix} V_{dc}^* \\ V_{qc}^* \end{bmatrix} \quad (4)$$

$$\begin{bmatrix} I_{dc} \\ I_{qc} \end{bmatrix} = \frac{2}{3} \cdot \begin{bmatrix} \cos(\theta_{dc}) & \sin(\theta_{dc}) \\ -\sin(\theta_{dc}) & \cos(\theta_{dc}) \end{bmatrix} \cdot \begin{bmatrix} 1 & -1/2 & -1/2 \\ 0 & \sqrt{3}/2 & -\sqrt{3}/2 \end{bmatrix} \cdot \begin{bmatrix} i_{uc} \\ i_{vc} \\ i_{wc} \end{bmatrix} \quad (5)$$

The above is the basic operation of the voltage control and phase control.

Next, the control characteristic when the induced-voltage coefficient setting section 108 and torque ripple suppression calculation section 109, which are the features of the present invention, are not provided is described.

FIGS. 3A-4B illustrate the effects which the induced voltage waveform $e_{uv}$ (line voltage between the u-phase and v-phase) of the permanent magnet motor 101 has on the torque characteristic of the magnet motor 101, in the control apparatus of FIG. 1.

Figure 3A:
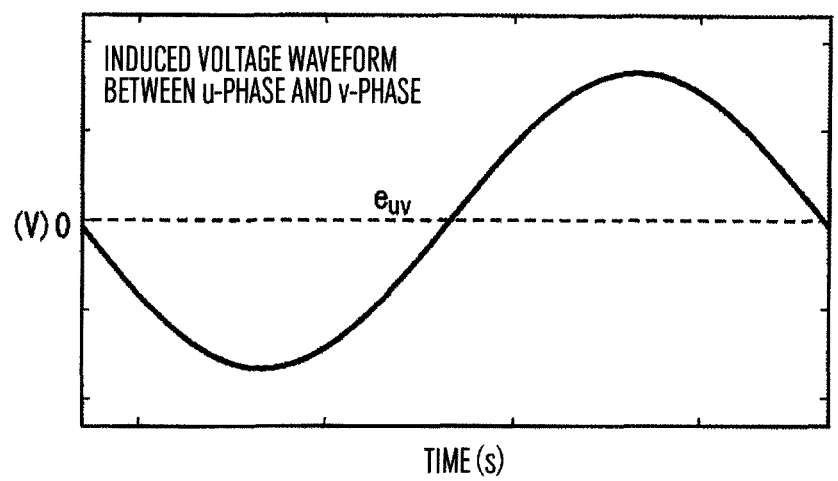
FIGS. 3A and 3B illustrate a torque characteristic when an induced voltage waveform of a magnet motor is a sine waveform.
Figure 3B:
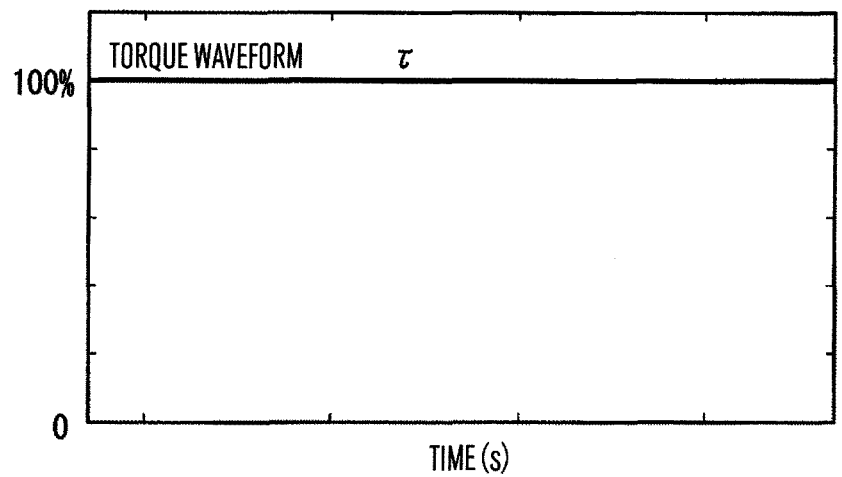

FIGS. 3A and 3B illustrate an output torque characteristic when a sinusoidal induced voltage is controlled and driven.

FIGS. 3A and 3B illustrate a relationship between the induced voltage waveform $e_{uv}$ and an output torque τ.

The output torque agrees with 100% value of a command value τ*. Here, there is no torque ripple and the motor is stably controlled.

Figure 4A:
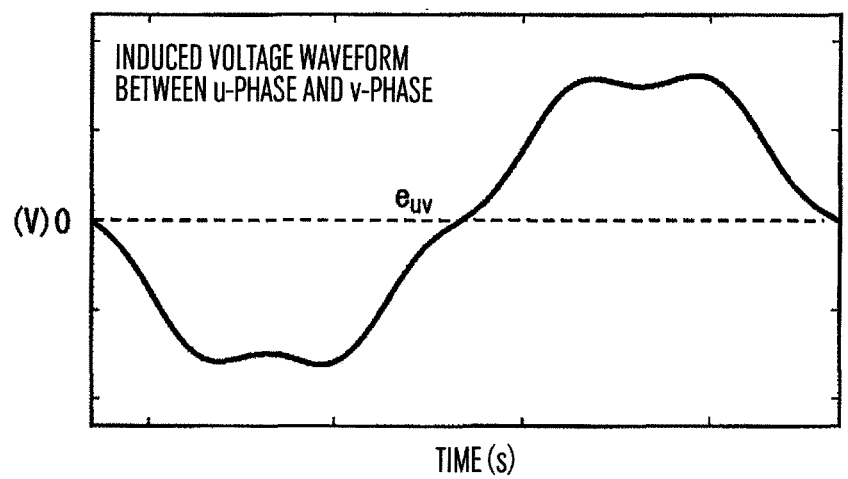
FIGS. 4A and 4B illustrate a torque characteristic when the induced voltage waveform of the magnet motor is distorted.
Figure 4B:
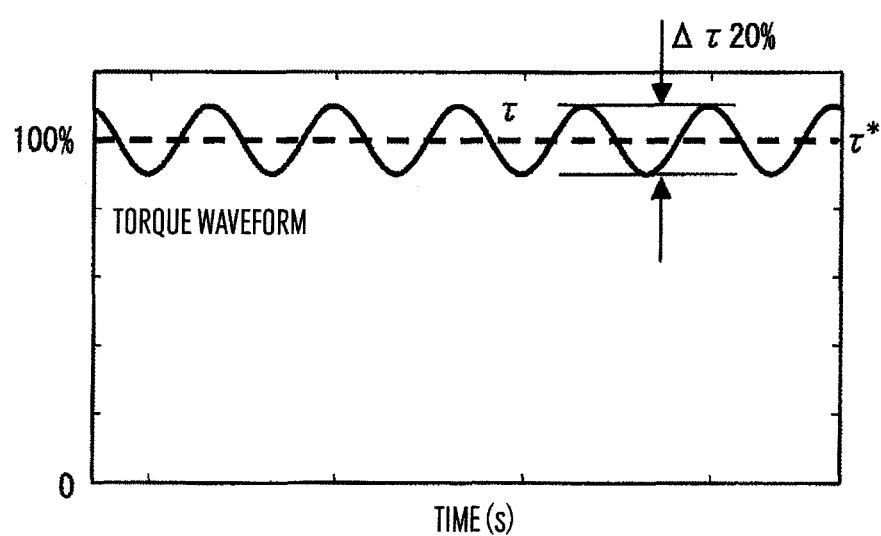

On the other hand, FIGS. 4A and 4B illustrate the characteristic when the induced voltage waveform (the line voltage between the u-phase and v-phase) is a rectangular waveform.

Here, an example is illustrated in which the induced voltage waveform of each phase (u-phase, v-phase, w-phase) contains the 5th order harmonic component of 10%. In this case, it can be seen that the torque ripple Δτ as large as the 6th order harmonic component of 20% is generated with respect to the torque command value τ*100%.

Hereinafter, the configurations of the induced-voltage coefficient setting section 108 and torque ripple suppression calculation section 109 which are the features of the present invention will be described.

Figure 5:
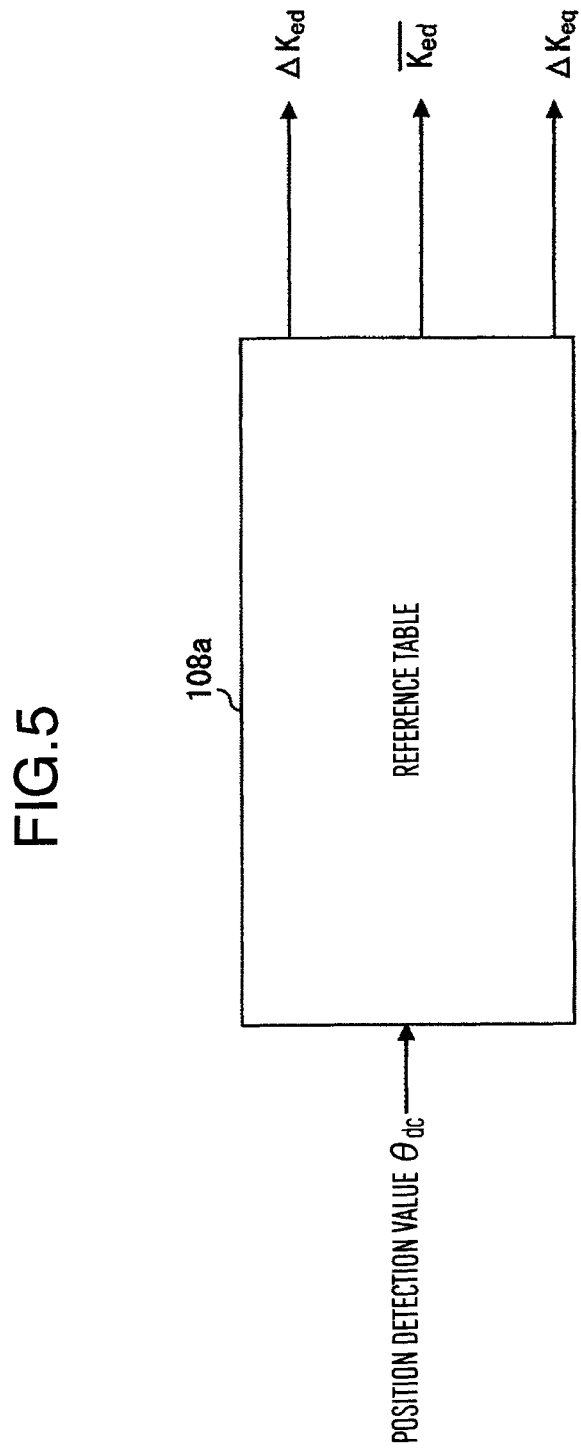
FIG. 5 illustrates a block diagram of an induced-voltage coefficient setting section which is a feature of the present invention.

With reference to FIG. 5, the configuration of the induced voltage setting section 108 is described.

In the induced voltage setting section 108, the position detection value $\theta_{dc}$ is input to a reference table 108a, and the information signals ($\Delta K_{ed}$, $\overline{K_{ed}}$, $\Delta K_{eq}$) of the induced voltage coefficient corresponding to the position detection value $\theta_{dc}$ are output.

Figure 6:
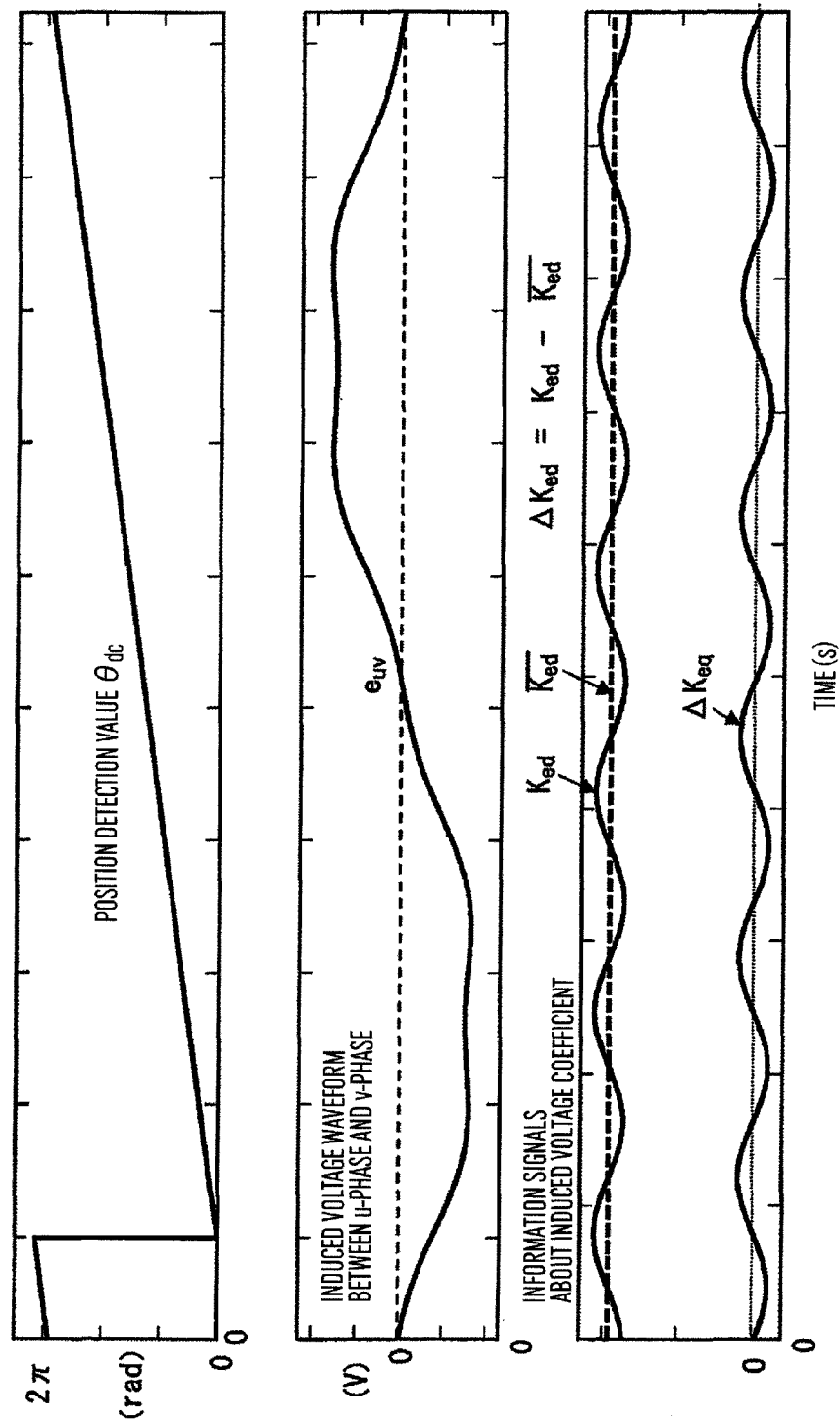
FIGS. 6A-6C illustrate a relational diagram of a position signal and an information signal of an induced voltage coefficient.

A "relationship between the position detection signal $\theta_{dc}$ and the information signals of the induced voltage coefficient" at this time is illustrated in FIGS. 6A-6C.

As the position detection signal $\theta_{dc}$ varies, the reference table outputs the information signals ($\Delta K_{ed}$, $\overline{K_{ed}}$, $\Delta K_{eq}$) of the induced voltage coefficient illustrated in FIG. 6C.

The induced voltage waveform $e_{uv}$ illustrated in FIG. 6B is for reference.

Here, the information signals of the induced voltage coefficient are obtained by dividing the three-phase AC induced voltage coefficient $K_e$ (the value obtained by dividing the induced voltage value by the electrical angle velocity ω of the motor) of the fixed coordinate system into the d-axis component value $K_{ed}$ and q-axis component value $K_{eq}$ of the rotating coordinate system.

Where $K_{ed}$: the induced voltage coefficient of the d-axis, $\overline{K_{ed}}$: the "DC component (average value)" of the induced voltage coefficient of the d-axis, $\Delta K_{ed}$: a "ripple component" of the induced voltage coefficient of the d-axis, and $\Delta K_{eq}$: a "ripple component" of the induced voltage coefficient of the q-axis.

Figure 7:
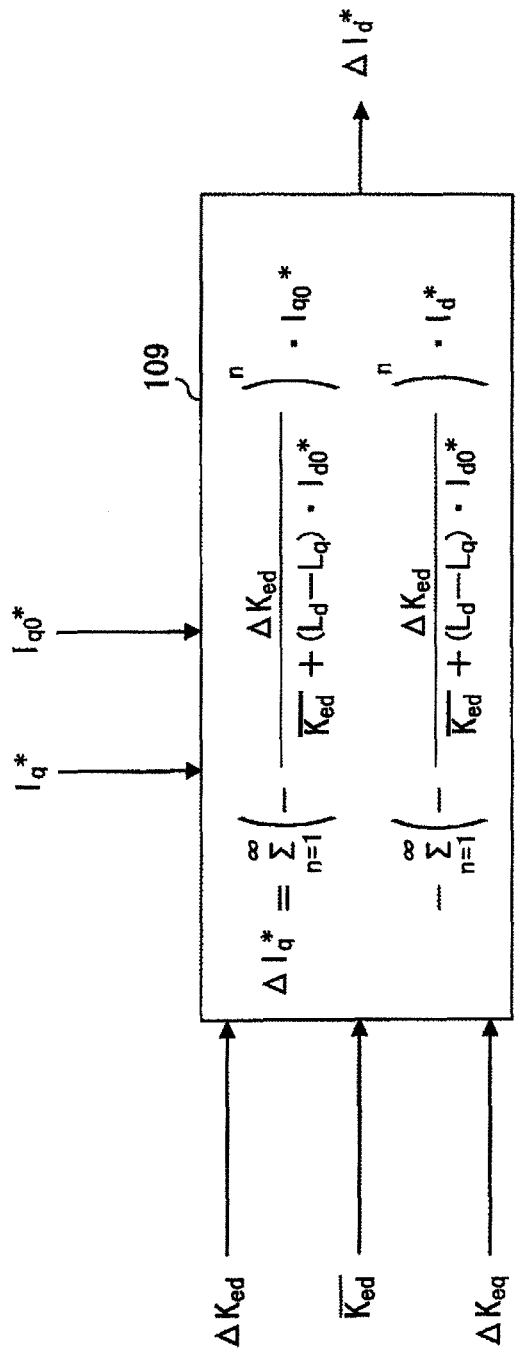
FIG. 7 illustrates a block diagram of a torque ripple suppression control calculation section which is a feature of the present invention.

Similarly, with reference to FIG. 7, the configuration of the torque ripple suppression calculation section 109 is described.

With the use of the signals ($\Delta K_{ed}$, $\overline{K_{ed}}$, $\Delta K_{eq}$) input to the torque ripple suppression calculation section 109 and the current command values $I_d^*$ and $I_{qo}^*$ of the d-axis and q-axis, the ripple current command value $\Delta I_q^*$ of the q-axis is calculated according to Formula (6).

$$\Delta I_q^* = \sum_{n=1}^{\infty} \left( \frac{\Delta K_{ed}}{\overline{K_{ed}} + (L_d - L_q) \cdot I_d^*} \right)^n \cdot I_{q0}^* - \sum_{n=1}^{\infty} \left( \frac{\Delta K_{eq}}{\overline{K_{ed}} + (L_d - L_q) \cdot I_d^*} \right)^n \cdot I_d^* \quad (6)$$

In Formula (6), n is ideally infinitive, however, actually, a sufficient effect can be obtained even with n=2, 3 or so.

Moreover, the adjustment of the magnitude of the current command value $I_d^*$ of the d-axis enables to arbitrarily control in a predetermined relationship the "ripple component" and "DC component" of the torque ripple.

Hereinafter, the principle on the torque ripple suppression calculation section 109 which is the feature of the present invention is described.

The output torque on the d-axis and q-axis is given by Formula (2).

Moreover, the induced voltage coefficients $K_{ed}$ and $K_{eq}$ of the d-axis and q-axis can be expressed by Formula (7).

$$\begin{bmatrix} K_{eq} \\ K_{ed} \end{bmatrix} = \begin{bmatrix} \Delta K_{eq} \\ \Delta K_{ed} + \overline{K_{ed}} \end{bmatrix} \quad (7)$$

In the currents $I_d$ and $I_q$ of the d-axis and q-axis, if the ripple components are denoted by $\Delta I_d$, $\Delta I_q$ and the DC components are denoted by $\overline{I_d}, \overline{I_q}$ then $$\begin{bmatrix} I_d \\ I_q \end{bmatrix} = \begin{bmatrix} \Delta I_d + \overline{I_d} \\ \Delta I_q + \overline{I_q} \end{bmatrix} \quad (8)$$

Substituting Formula (7) and Formula (8) into Formula (2), which is the output torque formula, yields $$\tau_m = \frac{3}{2} \cdot P_m \cdot [(L_d - L_q) \cdot (\Delta I_d + \overline{I_d}) \cdot (\Delta I_q + \overline{I_q})] + \quad (9)$$

-continued
$$\frac{3}{2} \cdot P_m \cdot [(\Delta K_{ed} + \overline{K_{ed}}) \cdot (\Delta I_q + \overline{I_q}) - \Delta K_{eq} \cdot (\Delta I_d - \overline{I_d})]$$

Here, if a case is considered where the AC current ($i_u$, $i_v$, $i_w$) of the magnet motor 1 is sinusoidally controlled, then $I_d = I_d^*$ ($\Delta I_d = 0$) and $I_q = I_q^*$ ($\Delta I_q = 0$), and if an ideal current control can be performed, then $$\tau_m = \frac{3}{2} \cdot P_m \cdot [(L_d - L_q) \cdot \overline{I_d} \cdot \overline{I_q} + (\Delta K_{ed} + \overline{K_{ed}}) \cdot \overline{I_q} - \Delta K_{eq} \cdot \overline{I_d}] \quad (10)$$

Moreover, the ripple components $\Delta K_{ed}$ and $\Delta K_{eq}$ are defined as Formula (11).

$$\begin{pmatrix} \Delta K_{ed} = \overline{\Delta K_{ed}} \cdot \sin(6\theta) \\ \Delta K_{eq} = \overline{\Delta K_{eq}} \cdot \cos(6\theta) \end{pmatrix} \quad (11)$$

Where
$\overline{\Delta K_{ed}}$: the "amplitude value of a ripple component" of the induced voltage coefficient of the d-axis,
$\overline{\Delta K_{eq}}$: the "amplitude value of a ripple component" of the induced voltage coefficient of the q-axis.
Substituting Formula (11) into Formula (10) yields Formula (12).

$$\tau_m = \frac{3}{2} \cdot P_m \cdot [ \quad (12)$$
$$(L_d - L_q) \cdot \overline{I_d} \cdot \overline{I_q} + \overline{K_{ed}} \cdot \overline{I_q} + \overline{\Delta K_{ed}} \cdot \overline{I_q} \cdot \sin(6\theta) - \overline{\Delta K_{eq}} \cdot \overline{I_d} \cdot \cos(6\theta)]$$

Figure 8A:
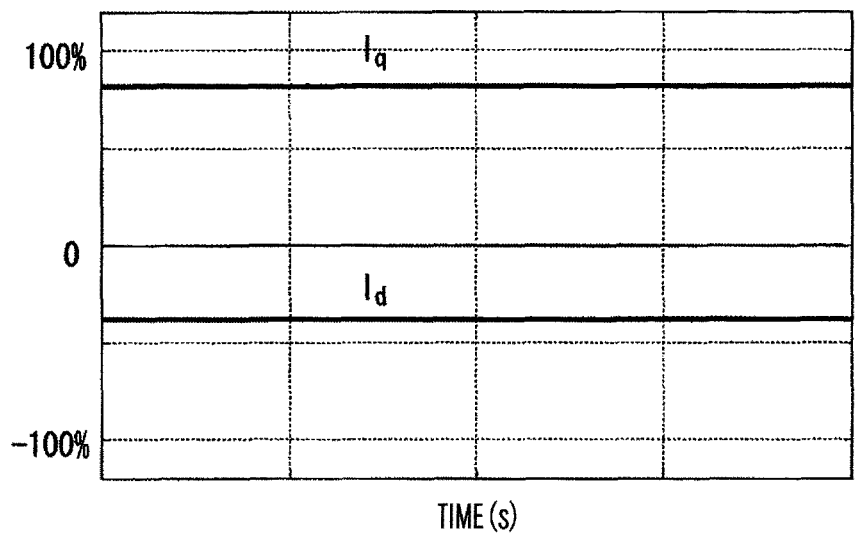
FIGS. 8A and 8B illustrate the torque control characteristics when a magnet motor whose induced voltage waveform is distorted is sinusoidally driven.
Figure 8B:
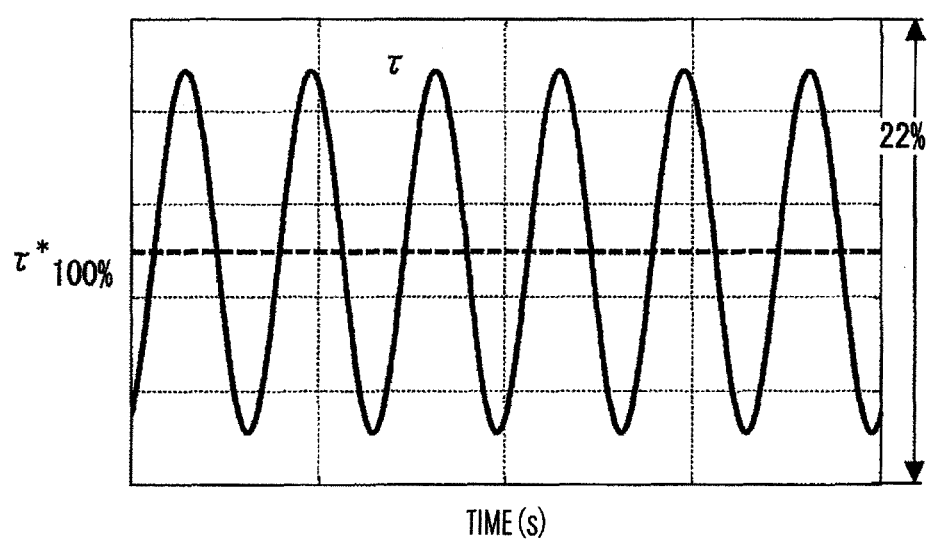

The torque control characteristic at this time is illustrated in FIGS. 8A and 8B.

As can be seen, although the currents $I_d$ and $I_q$ of the d-axis and d-axis each have a constant value, a little less than 20% of torque ripple of the 6th order harmonic component is generated due to $\Delta K_{ed}$, $\Delta K_{eq}$.

In the torque ripple suppression calculation section 109, the ripple current command value $\Delta I_q^*$ of the q-axis is calculated according to Formula (13).

$$\Delta I_q^* = \quad (13)$$
$$\sum_{n=1}^{\infty} \left( \frac{-\Delta K_{ed}}{\overline{K_{ed}} + (L_d - L_q) \cdot I_d^*} \right)^n \cdot I_{q0}^* - \sum_{n=1}^{\infty} \left( \frac{-\Delta K_{eq}}{\overline{K_{ed}} + (L_d - L_q) \cdot I_d^*} \right)^n \cdot I_d^*$$

Where n is an integer of 1 or greater.
Here, as an example, the consideration of the terms up to the third term yields Formula (14).

$$\Delta I_q^* \approx + \left( -\left( \frac{\Delta K_{ed}}{\overline{K_{ed}} + (L_d - L_q) \cdot I_d^*} \right)^1 + \quad (14) \right.$$
$$\left( \frac{\Delta K_{ed}}{\overline{K_{ed}} + (L_d - L_q) \cdot I_d^*} \right)^2 - \left( \frac{\Delta K_{ed}}{\overline{K_{ed}} + (L_d - L_q) \cdot I_d^*} \right)^3 \right) \cdot \overline{I_{q0}^*} -$$
$$\left( -\left( \frac{\Delta K_{eq}}{\overline{K_{ed}} + (L_d - L_q) \cdot I_d^*} \right)^1 + \left( \frac{\Delta K_{eq}}{\overline{K_{ed}} + (L_d - L_q) \cdot I_d^*} \right)^2 - \right.$$

$$\left. \left( \frac{\Delta K_{eq}}{\overline{K_{ed}} + (L_d - L_q) \cdot I_d^*} \right)^3 \right) \cdot \overline{I_d^*}$$

Formula (14) is substituted into $\Delta I_q$ of Formula (9), and then the current control calculation section 110 controls so as to set $\overline{I_d} = I^*_d, \overline{I_q} = I^*_{q0}$, so that the output torque $\tau_m$ is given by Formula (15).

$$\tau_m = \frac{3}{2} \cdot P_m \cdot (L_d - L_q) \cdot \overline{I_d} \cdot \overline{I_q} + \quad (15)$$
$$\overline{K_e} \cdot \overline{I_q} - \frac{3}{2} \cdot P_m \cdot \overline{I_q} \cdot \frac{\Delta K_{ed}^4}{(\overline{K_{ed}} + (L_d - L_q) \cdot \overline{I_d})^3} +$$
$$\frac{3}{2} \cdot P_m \cdot \overline{I_q} \cdot \left( + \frac{\Delta K_{eq} \cdot (\Delta K_{ed} - \Delta K_{eq})}{(\overline{K_{ed}} + (L_d - L_q) \cdot \overline{I_d})^1} - \right.$$
$$\left. \frac{\Delta K_{eq}^2 \cdot (\Delta K_{ed} - \Delta K_{eq})}{(\overline{K_{ed}} + (L_d - L_q) \cdot \overline{I_d})^2} + \frac{\Delta K_{eq}^3 \cdot \Delta K_{ed}}{(\overline{K_{ed}} + (L_d - L_q) \cdot \overline{I_d})^3} \right)$$

Here, the approximation of Formula (15) yields Formula (16).

$$\tau_m \approx \frac{3}{2} \cdot P_m \cdot \left[ (L_d - L_q) \cdot \overline{I_d} \cdot \overline{I_q} + \overline{K_e} \cdot \overline{I_q} + \overline{I_d} \cdot \frac{\Delta K_{eq} \cdot (\Delta K_{ed} - \Delta K_{eq})}{\overline{K_{ed}} + (L_d - L_q) \cdot \overline{I_d}} \right] \quad (16)$$

Moreover, in Formula (11), if the 7th order harmonic component contained in the three-phase AC induced voltage waveform is approximately zero, then $\overline{\Delta K_{ed}} \approx \overline{\Delta K_{eq}}$. Rearrangement of Formula (15) yields Formula (17).

$$\tau_m \approx \frac{3}{2} \cdot P_m \cdot \left[ (L_d - L_q) \cdot \overline{I_d} \cdot \overline{I_q} + \overline{K_e} \cdot \overline{I_q} - \frac{1}{2} \cdot \frac{\overline{I_d} \cdot \overline{K_{ed}^2}}{\overline{K_{ed}} + (L_d - L_q) \cdot \overline{I_d}} \right] + \quad (17)$$
$$\frac{3}{2} \cdot P_m \cdot \left[ \frac{1}{2} \cdot (\cos[12\theta] - \sin[12\theta]) \cdot \frac{\overline{I_d} \cdot \overline{K_{ed}^2}}{\overline{K_{ed}} + (L_d - L_q) \cdot \overline{I_d}} \right]$$

That is, by arbitrarily setting the magnitude of the current $I_d$ of the d-axis, the "DC torque component" shown in Formula (19) can be increased by the "magnitude of a half the peak value (p–p) of the 12th order harmonic ripple torque component".

Ripple Torque Component:

$$\Delta \tau_m \approx \frac{3}{2} \cdot P_m \cdot \left[ \frac{1}{2} \cdot (\cos[12\theta] - \sin[12\theta]) \cdot \frac{\overline{I_d} \cdot \overline{K_{ed}^2}}{\overline{K_{ed}} + (L_d - L_q) \cdot \overline{I_d}} \right] \quad (18)$$

DC Torque Component:

$$\overline{\Delta \tau_m} \approx \frac{3}{2} \cdot P_m \cdot \left[ -\frac{1}{2} \cdot \frac{\overline{I_d} \cdot \overline{K_{ed}^2}}{\overline{K_{ed}} + (L_d - L_q) \cdot \overline{I_d}} \right] \quad (19)$$

If the current $I_d$ of the d-axis is set according to Formula (20), then the DC torque component $\overline{\Delta \tau_m}$ of Formula (19) can be increased.

$$\overline{I_d} < 0$$

$$(L_d - L_q) \cdot \overline{I_d} < \overline{K_{ed}} \quad (20)$$

Figure 9A:
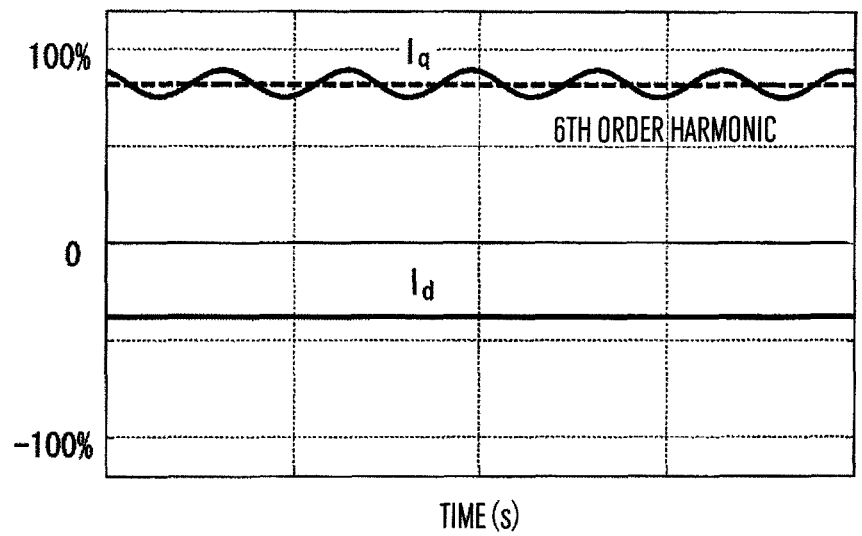
FIGS. 9A and 9B illustrate the torque control characteristics when the present invention is used.
Figure 9B:
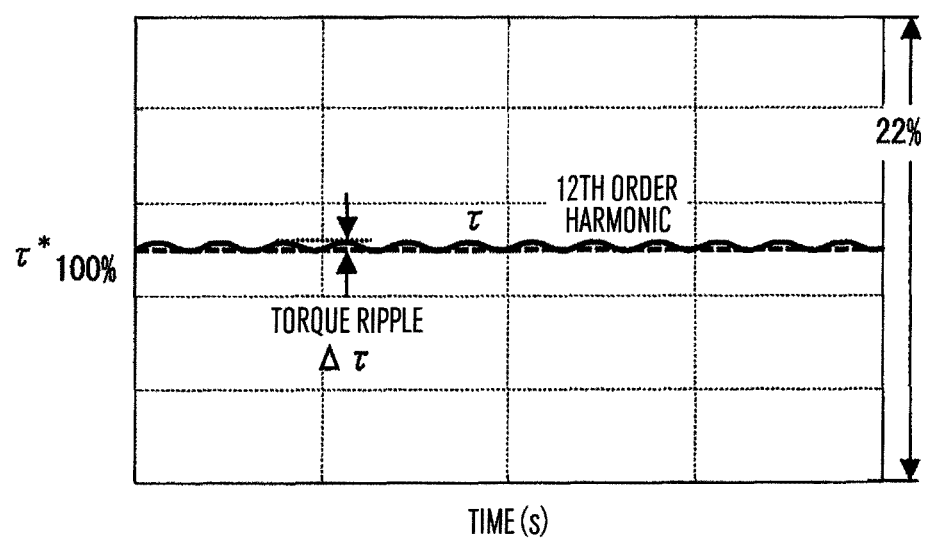

The characteristics when this torque ripple suppression compensation is performed are illustrated in FIGS. 9A and 9B.

Thanks to this suppression compensation, as compared to the characteristic of FIGS. 8A and 8B (with no suppression compensation), the 6th order harmonic component can be reduced significantly and the "DC torque component" can be increased by the magnitude of a half the ripple torque component $\Delta\tau$ of the 12th order harmonic component.

That is, the "ripple component" and "DC component" of the torque ripple can be arbitrarily controlled by changing the magnitude of the d-axis current $I_d$.

Second Embodiment

Figure 10:
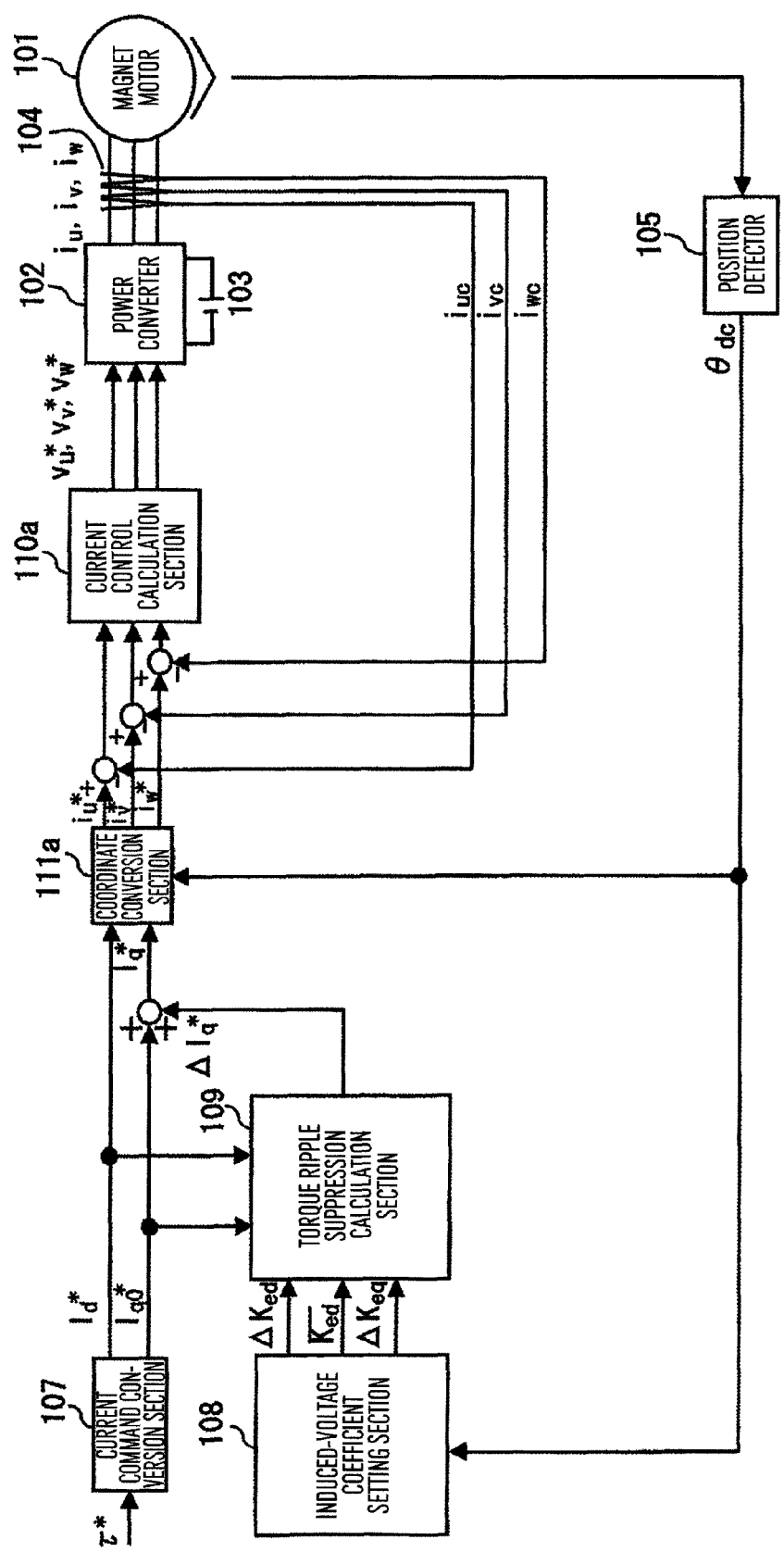
FIG. 10 illustrates another embodiment of the present invention.

FIG. 10 illustrates another embodiment of the present invention.

In the first embodiment, the current control calculation is performed on the d-axis and q-axis of the rotating coordinate system, while in this embodiment, the current control calculation in the three-phase AC (u, v, w) of the fixed coordinate system is performed.

In this diagram, unless otherwise stated, the individual constituent element is the same as that of FIG. 1.

A coordinate conversion section 111a receives the current command value $I_d^*$ of the d-axis, and $I_q^*$ which is the added value of the ripple current command value $\Delta I_q^*$ of the q-axis (i.e., the output of the torque ripple calculation section 109), and the current command value $I_{qo}^*$ of the q-axis (i.e., the output of current command conversion section 107), and calculates the three-phase AC current command values ($i_u^*$, $i_v^*$, $i_w^*$) according to Formula (21) and output the same.

$$\begin{bmatrix} i_u^* \\ i_v^* \\ i_w^* \end{bmatrix} = \begin{bmatrix} 1 & 0 \\ -1/2 & \sqrt{3}/2 \\ -1/2 & -\sqrt{3}/2 \end{bmatrix} \cdot \begin{bmatrix} \cos(\theta_{dc}) & -\sin(\theta_{dc}) \\ \sin(\theta_{dc}) & \cos(\theta_{dc}) \end{bmatrix} \cdot \begin{bmatrix} I_d^* \\ I_q^* \end{bmatrix} \quad (21)$$

A current control calculation section 110a receives the three-phase AC current command values ($i_u^*$, $i_v^*$, $i_w^*$) and the three-phase AC current detection values ($i_{uc}$, $i_{vc}$, $i_{wc}$) and calculates the three-phase AC voltage command values ($v_u^*$, $v_v^*$, $v_w^*$) according to Formula (22) and outputs the same.

$$\begin{cases} v_u^* = (i_u^* - i_{uc}) \cdot \left(K_p + \dfrac{K_i}{s}\right) \\ v_v^* = (i_v^* - i_{vc}) \cdot \left(K_p + \dfrac{K_i}{s}\right) \\ v_w^* = (i_w^* - i_{wc}) \cdot \left(K_p + \dfrac{K_i}{s}\right) \end{cases} \quad (22)$$

Where
$K_p$: the proportional gain of AC current control, and
$K_i$: the integration gain of AC current control.

Even when such a three-phase AC current control calculation is performed, the torque ripple of the Nth order harmonic component can be suppressed by controlling the output voltage of the inverter.

In this embodiment, the coordinate conversion into the three-phase AC is performed after adding the current command value $I_{qo}^*$ of the q-axis to the ripple current command value $\Delta I_q^*$ of the q-axis. However, a method may be employed in which according to the calculation shown in Formula (23), the ripple current command value $\Delta I_q^*$ is coordinate-converted into the three-phase AC, and the ripple AC current command values ($\Delta i_u^*$, $\Delta i_v^*$, $\Delta i_w^*$) are calculated as in Formula (23).

$$\begin{bmatrix} \Delta i_u^* \\ \Delta i_v^* \\ \Delta i_w^* \end{bmatrix} = \begin{bmatrix} 1 & 0 \\ -1/2 & \sqrt{3}/2 \\ -1/2 & -\sqrt{3}/2 \end{bmatrix} \cdot \begin{bmatrix} \cos(\theta_{dc}) & -\sin(\theta_{dc}) \\ \sin(\theta_{dc}) & \cos(\theta_{dc}) \end{bmatrix} \cdot \begin{bmatrix} I_d^* \\ \Delta I_q^* \end{bmatrix} \quad (23)$$

Then, the three-phase AC ripple current command values ($\Delta i_u^*$, $\Delta i_v^*$, $\Delta i_w^*$) shown in Formula (23) are added to the three-phase AC current command values ($i_{u0}^*$, $i_{v0}^*$, $i_{w0}^*$), which are coordinate-converted from the current command values $I_d^*$ and $I_{q0}^*$ of the d-axis and q-axis into the three-phase AC.

$$\begin{bmatrix} i_u^* \\ i_v^* \\ i_w^* \end{bmatrix} = \begin{bmatrix} i_{u0}^* \\ i_{v0}^* \\ i_{w0}^* \end{bmatrix} + \begin{bmatrix} \Delta i_u^* \\ \Delta i_v^* \\ \Delta i_w^* \end{bmatrix} \quad (24)$$

Third Embodiment

Figure 11:
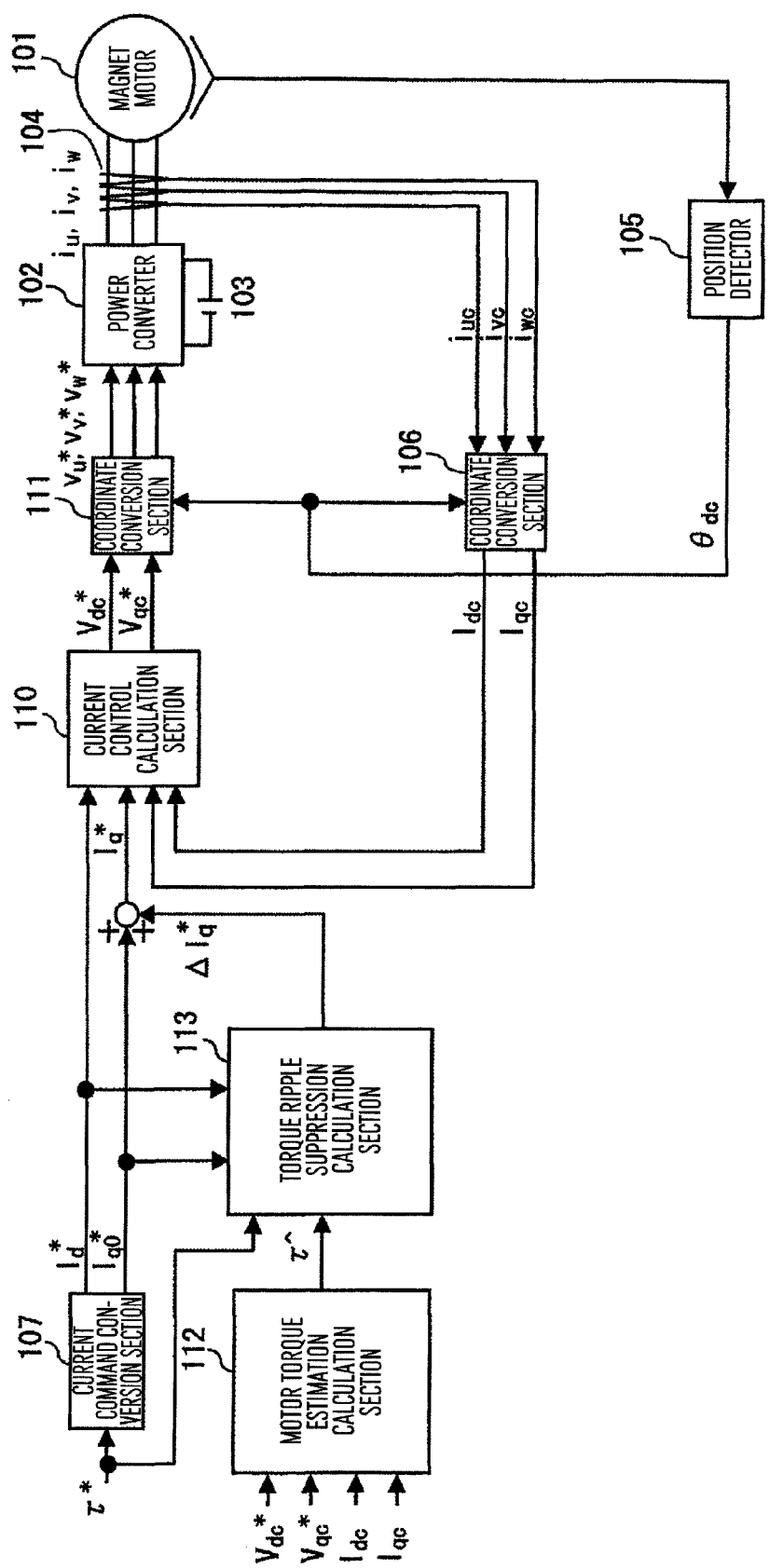
FIG. 11 illustrates yet another embodiment of the present invention.

FIG. 11 illustrates another embodiment of the present invention.

In the first embodiment, a method using formula calculation is employed in the torque ripple suppression calculation section 113, however, in this embodiment, the torque ripple suppression calculation is performed using feedback compensation.

In this diagram, unless otherwise stated, the individual constituent element is the same as that of FIG. 1.

Next, a motor torque estimation calculation section 112 and torque ripple suppression calculation section 113 which are the features of the present invention are described.

The motor torque estimation calculation section 112 receives $V_{dc}^*$, $V_{qc}^*$ which are the output values of the current control calculation section 110 and $I_{dc}$, $I_{qc}$ which are the output values of the coordinate conversion section 106, and outputs a torque estimation value $\hat{\tau}$ of the magnet motor 101.

The torque ripple suppression calculation section 113 receives the torque command values $\tau^*$, and $\hat{\tau}$ which is the output value of the motor torque estimation calculation section 112, and outputs the ripple current command value $\Delta I_q^*$ of the q-axis.

Figure 12:
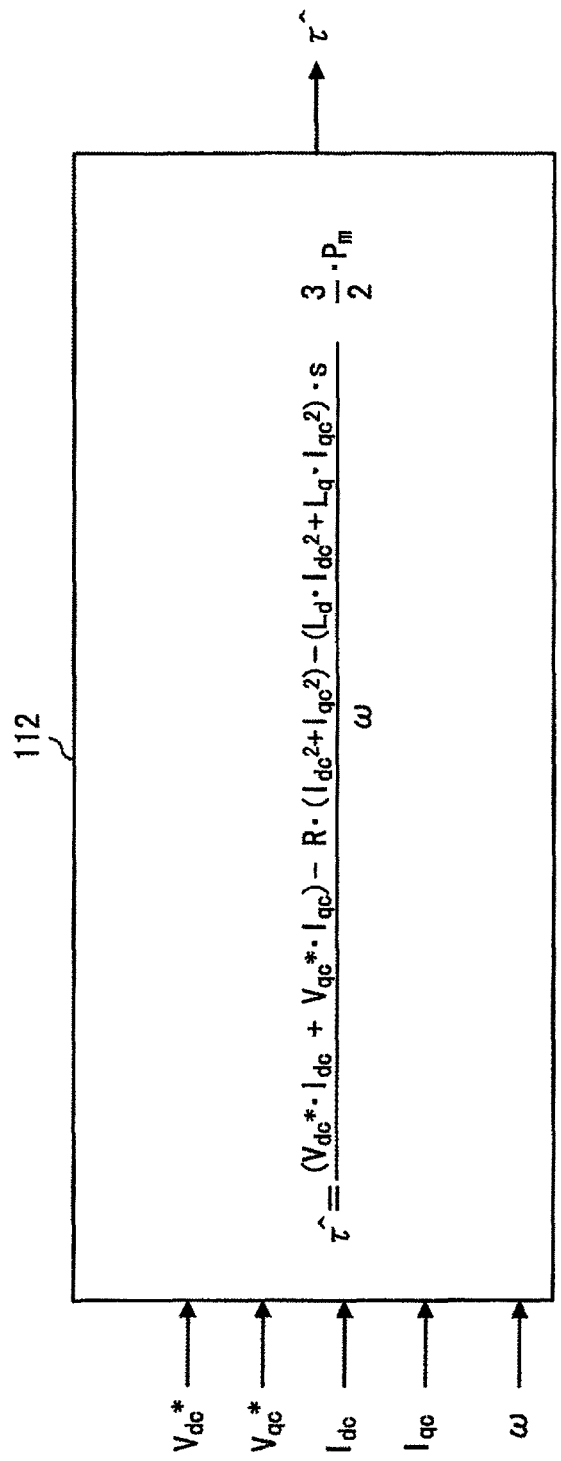
FIG. 12 illustrates a block diagram of a motor torque estimation calculation section which is a feature of the present invention.

Here, with reference to FIG. 12, the configuration of the motor torque estimation calculation section 112 is described.

In the motor torque estimation calculation section 112, with the use of the effective power P ($V_{dc}^* \cdot I_{dc} + V_{qc}^* \cdot I_{qc}$) of the magnet motor 101, the torque estimation value $\hat{\tau}$ of the magnet motor 101 is calculated according to Formula (25).

$$\hat{\tau} = \dfrac{\left(\begin{array}{c} V_{dc}^* \cdot I_{dc} + \\ V_{qc}^* \cdot I_{qc} \end{array}\right) - R \cdot \left(\begin{array}{c} I_{dc}^2 + \\ I_{qc}^2 \end{array}\right) - \left(\begin{array}{c} L_d \cdot I_{dc}^2 + \\ L_q \cdot I_{qc}^2 \end{array}\right) \cdot s}{\omega} \cdot \dfrac{3}{2} \cdot P_m \quad (25)$$

Here, an angular velocity calculation value $\omega$ of the motor is determined by a differential operation shown in Formula (26), using the position detection value $\theta_{dc}$.

$$\omega = \dfrac{d}{dt} \cdot \theta_{dc} \quad (26)$$

Figure 13:
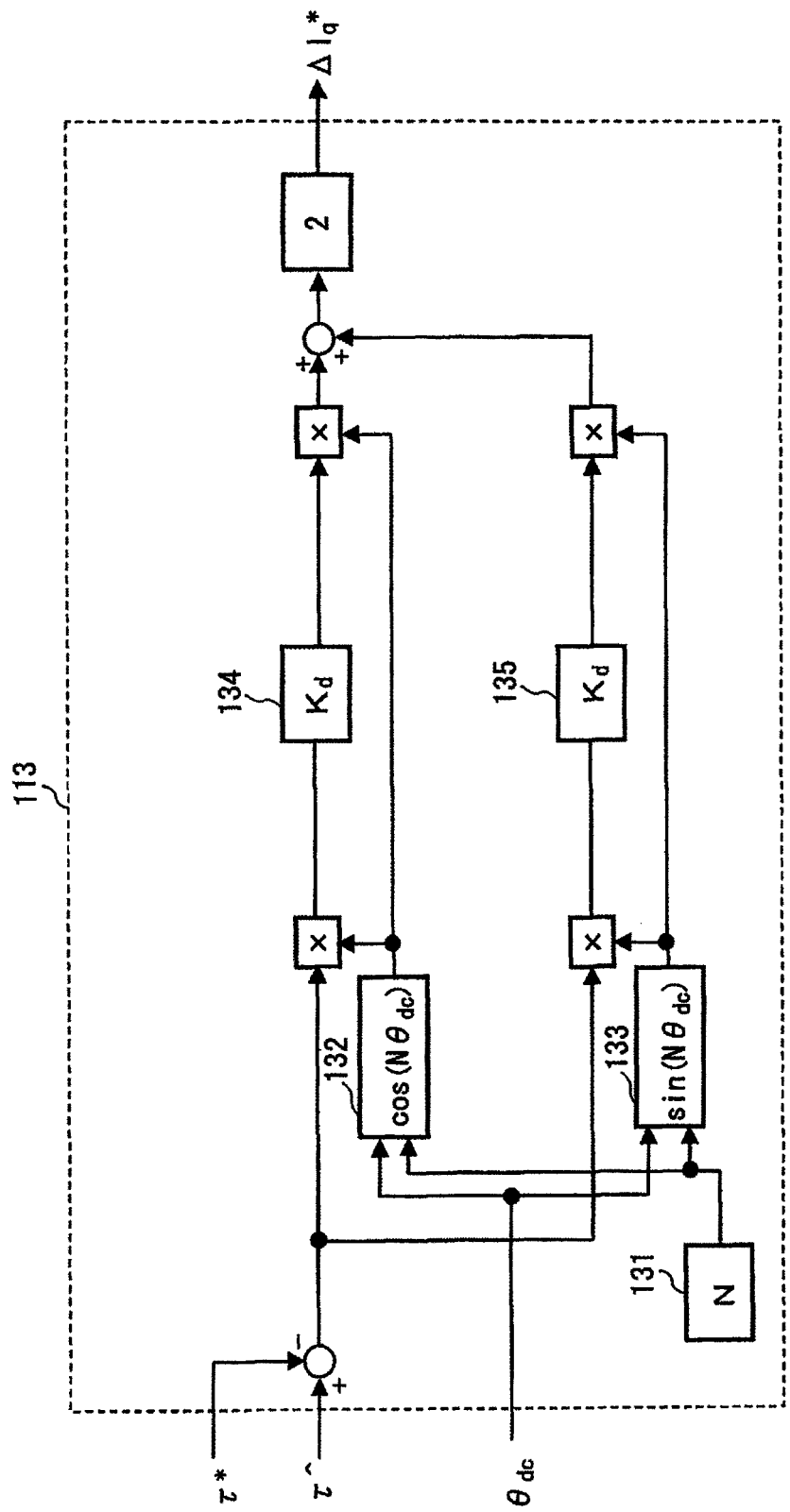
FIG. 13 illustrates a block diagram of the torque ripple suppression calculation section of the present invention.

Next, with reference to FIG. 13, the configuration of the torque ripple suppression calculation section 113 is described.

In the torque ripple suppression calculation section 113, the position detection value $\theta_{dc}$ and a constant N of a block 131 are input to a cosine signal generation section 132 and a sine signal generation section 133.

The output signal (cos [$N\theta_{dc}$], sin [$N\theta_{dc}$]) of the cosine signal generation section 132 and sine signal generation section 133 are multiplied by $\Delta\tau_{rip}$ which is the deviation between the torque command value $\tau^*$ and the torque estimation value $\hat{\tau}$, and is further multiplied by a constant $K_d$ of blocks 134, 135 which is a proportional gain. The output signals of the cosine signal generation section 132 and sine signal generation section 133 are again multiplied by the output signals of the blocks 134, 135 of the constant $K_d$, respectively, and these multiplication results are added together and doubled, and the resulting value is output as the current command value $\Delta I_q^*$ of the q-axis ripple.

Here, the principle on the torque ripple suppression calculation section 113 which is the feature of the present invention is described.

In the torque ripple suppression calculation section 113, the cosine signal generation section 132 and sine signal generation section 133 receive the position detection value $\theta_{dc}$ and the order N of the ripple frequency of the torque ripple (the order of the largest harmonic component contained in one period of an electric frequency), and calculate the cosine signal and sine signal of their multiplication value ($N\theta_{dc}$).

Furthermore, $\Delta\tau_{rip}$ ($\tau^*-\hat{\tau}$) which is the deviation between the torque command value $\tau^*$ and the torque estimation value $\hat{\tau}$ is calculated.

The torque ripple component $\Delta\hat{\tau}_{rip}$ is defined as in Formula (27).

$$\Delta\hat{\tau}_{rip} = |\Delta\hat{\tau}_{rip}| \cdot \sin(N \cdot \theta_{dc}) \tag{27}$$

Where $|\Delta\hat{\tau}_{rip}|$ is the amplitude value of the Nth order harmonic component of the torque ripple.

If the calculation results obtained by multiplying the respective output signals of the cosine signal generation section 132 and sine signal generation section 133 by $\Delta\hat{\tau}_{rip}$ are denoted by $\Delta\hat{\tau}_{a1}$ and $\Delta\hat{\tau}_{b1}$, then $$\begin{bmatrix} \Delta\hat{\tau}_{a1} \\ \Delta\hat{\tau}_{b1} \end{bmatrix} = |\Delta\hat{\tau}_{rip}| \cdot \sin(N \cdot \theta_{dc}) \cdot \begin{bmatrix} \cos(N \cdot \theta_{dc}) \\ \sin(N \cdot \theta_{dc}) \end{bmatrix} \tag{28}$$

The signals $\Delta\hat{\tau}_{a1}$ and $\Delta\hat{\tau}_{b1}$ are multiplied by the proportional gain K of the blocks 134, 135.

If the results of performing the calculation of Formula (28) are denoted by $\Delta\hat{\tau}_{a2}$ and $\Delta\hat{\tau}_{b2}$, then $$\begin{bmatrix} \Delta\hat{\tau}_{a2} \\ \Delta\hat{\tau}_{b2} \end{bmatrix} = K \cdot \begin{bmatrix} \Delta\hat{\tau}_{a1} \\ \Delta\hat{\tau}_{b1} \end{bmatrix} \cdot \begin{bmatrix} \cos(N \cdot \theta_{dc}) \\ \sin(N \cdot \theta_{dc}) \end{bmatrix} \tag{29}$$

$$= K \cdot |\Delta\hat{\tau}_{rip}| \cdot \sin(N \cdot \theta_{dc}) \cdot \begin{bmatrix} \cos(N \cdot \theta_{dc}) \\ \sin(N \cdot \theta_{dc}) \end{bmatrix}$$

Next, with the use of the signals $\Delta\hat{\tau}_{a2}$ and $\Delta\hat{\tau}_{b2}$, the ripple current command value $\Delta I_q^*$ of the q-axis is calculated according to Formula (30).

$$\Delta I_q^* = [\Delta\hat{\tau}_{a2} \cdot \cos(N \cdot \theta_{dc}) + \Delta\hat{\tau}_{a2} \cdot \sin(N \cdot \theta_{dc})] \tag{30}$$

$$= K \cdot |\Delta\hat{\tau}_{rip}| \cdot \sin(N \cdot \theta_{dc}) \cdot \cos^2(N \cdot \theta_{dc}) +$$

-continued $$K \cdot |\Delta\hat{\tau}_{rip}| \cdot \sin(N \cdot \theta_{dc}) \cdot \sin^2(N \cdot \theta_{dc})$$

$$= K \cdot |\Delta\hat{\tau}_{rip}| \cdot \sin(N \cdot \theta_{dc})$$

The torque ripple of the Nth order harmonic component can be suppressed by adding the calculation value $\Delta I_q^*$ to the current command value of the q-axis $I_q^*$ and controlling the output voltage of the inverter.

Figure 14A:
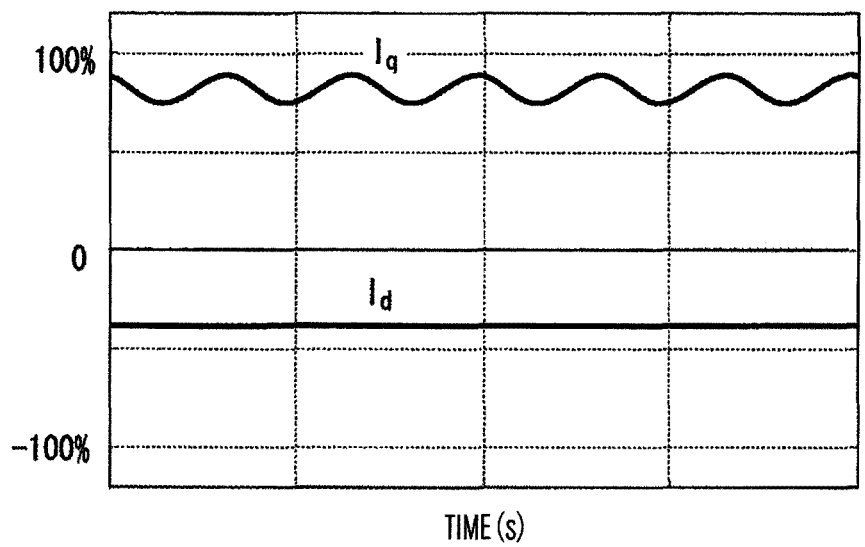
FIGS. 14A and 14B illustrate the torque control characteristics when the present invention is used.
Figure 14B:
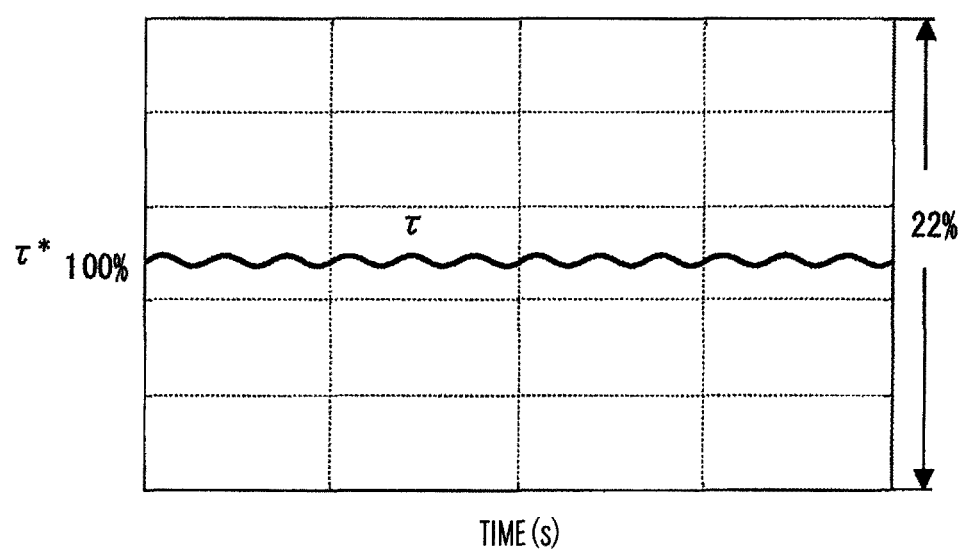

FIGS. 14A and 14B illustrate the control characteristic when the present invention (N=6 is set) is used.

It can be seen that this control characteristic can be favorably compared with that of FIGS. 9A and 9B.

In this embodiment, the multiplication value of the signal $\Delta\hat{\tau}_{rip}$ and the outputs of the cosine and sine signal generation sections 132, 133 is directly multiplied by the constant of the blocks 134, 135 which is the proportional gain, however, a low pass filter for removing noise components may be inserted before multiplying the constant of the blocks 134, 135.

Moreover, in place of the constant of the blocks 134, 135 (proportional operation), an integral operation may be performed.

Furthermore, a plurality of torque ripple suppression calculation sections 109 may be prepared. The preparation of a plurality of torque ripple suppression calculation sections 109 allows for a more accurate torque control.

Fourth Embodiment

Figure 15:
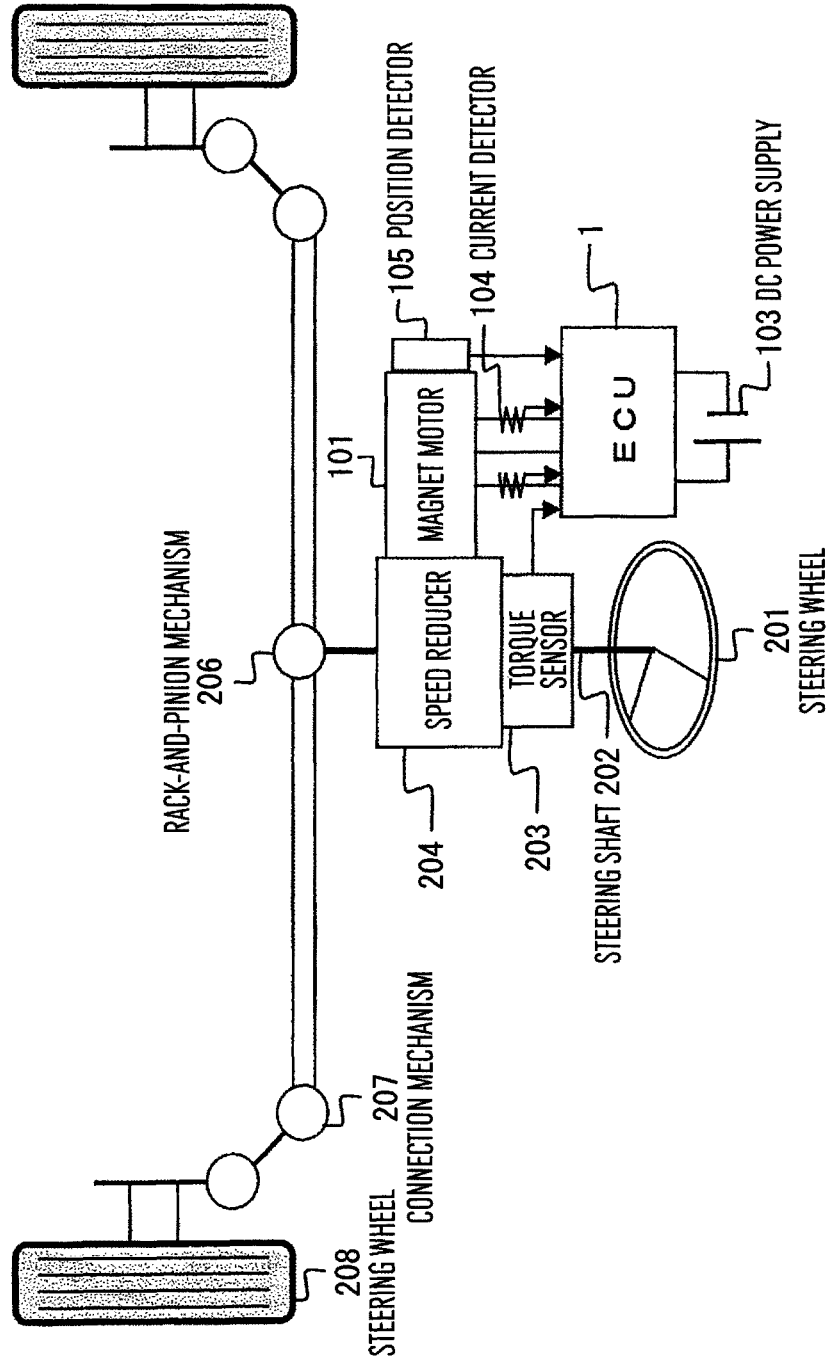
FIG. 15 illustrates one embodiment of the electric power steering to which the present invention is applied.

FIG. 15 illustrates another embodiment of the present invention.

In this embodiment, Embodiment 1 is applied to an electric power steering apparatus.

Unless otherwise stated, the individual constituent element is the same as that of Embodiment 1 and the description thereof is omitted.

This electric power steering apparatus comprises: a steering wheel 201; a steering shaft 202; a torque sensor 203; a speed reducer 204 for coupling the steering shaft 202 with the magnet motor 101; the power converter 102, an ECU including the coordinate conversion section 106 to the coordinate conversion section 111 of Embodiment 1 to Embodiment 3; a rack-and-pinion mechanism 206; a connection mechanism 207 such as a tie rod; and a steering wheel 208.

The ECU 1 controls a three-phase voltage command value so as to match a torque command value with the output torque obtained from the torque sensor 203. The magnet motor 101, via the speed reducer 204, acts to exert an assist force onto the steering shaft 202, thereby assisting a driver in steering.

Moreover, as in Embodiment 1 to Embodiment 3, even when an inexpensive magnet motor whose induced voltage is distorted is used in the electric power steering apparatus, an accurate torque control can be realized.

Application of the present control to the electric power steering apparatus enables the setting for focusing, in the low speed region of a motor, on the suppression of the "ripple component" of the torque ripple while in the high speed region, on the securing of the "DC component".

With the use of the present invention, when a driver slowly steers the steering wheel 101, the driver can obtain a smooth steering feeling.

Moreover, the "DC torque component" is secured in the high speed region of the magnet motor, so that an increase in the output power of the magnet motor can be achieved and a reduction in the size of the motor can be achieved.

Note that, so far, in the first to fourth embodiments, from the current command values $I_d^*$, $I_q^*$ and the current detection values $I_{dc}$, $I_{qc}$, the voltage command values $V_{dc}^*$, $V_{qc}^*$ are prepared to preform the vector control, however, the present invention can be used in the vector control method, wherein from the current detection value $I_{dc}$, $I_{qc}$ and the current command values $I_d^*$, $I_q^*$, the voltage correction values $\Delta V_d$, $\Delta V_q$ are prepared, and with the use of these voltage correction values, the current command values $I_d^*$, $I_q^*$, the speed calculation value w, and the constants of the magnet motor 1, voltage command values $V_{dc}^{*\prime}$, $V_{qc}^{*\prime}$ are calculated according to Formula (31).

$$\begin{bmatrix} V_{dc}^{*\prime} \\ V_{qc}^{*\prime} \end{bmatrix} = \begin{bmatrix} R^* & -\omega \cdot L_q^* \\ \omega \cdot L_d^* & R^* \end{bmatrix} \cdot \begin{bmatrix} I_d^* \\ I_q^* \end{bmatrix} + \begin{bmatrix} 0 \\ \omega \cdot K_e^* \end{bmatrix} + \begin{bmatrix} \Delta V_d \\ \Delta V_q \end{bmatrix} \quad (31)$$

Moreover, the present invention can be used also in the vector control method, wherein from the current command values $I_d^*$, $I_q^*$ and the current detection values $I_{dc}$, $I_{qc}$, second current command values $I_d^{}$, $I_q^{}$ are prepared and used.

$$\begin{bmatrix} V_{dc}^{*\prime} \\ V_{qc}^{*\prime} \end{bmatrix} = \begin{bmatrix} R^* & -\omega \cdot L_q^* \\ \omega \cdot L_d^* & R^* \end{bmatrix} \cdot \begin{bmatrix} I_d^{} \\ I_q^{} \end{bmatrix} + \begin{bmatrix} 0 \\ \omega \cdot K_e^* \end{bmatrix} \quad (32)$$

Furthermore, it is apparent that if in place of the induced voltage coefficient $k_e^*$ in Formula (31) and Formula (32), the calculations such as Formula (33) and Formula (34) are performed, then the load of the current control calculation section can be reduced and the ability to follow the current command value can be improved.

$$\begin{bmatrix} V_{dc}^{*\prime} \\ V_{qc}^{*\prime} \end{bmatrix} = \begin{bmatrix} R^* & -\omega \cdot L_q^* \\ \omega \cdot L_d^* & R^* \end{bmatrix} \cdot \begin{bmatrix} I_d^* \\ I_q^* \end{bmatrix} + \begin{bmatrix} \omega \cdot K_{eq} \\ \omega \cdot K_{ed} \end{bmatrix} + \begin{bmatrix} \Delta V_d \\ \Delta V_q \end{bmatrix} \quad (33)$$

Moreover, the present invention can be used also in the vector control method, wherein from the current command values $I_d^*$, $I_q^*$ and the current detection values $I_{dc}$, $I_{qc}$, the second current command values $I_d^{}$, $I_q^{}$ are prepared and used.

$$\begin{bmatrix} V_{dc}^{*\prime} \\ V_{qc}^{*\prime} \end{bmatrix} = \begin{bmatrix} R^* & -\omega \cdot L_q^* \\ \omega \cdot L_d^* & R^* \end{bmatrix} \cdot \begin{bmatrix} I_d^{} \\ I_q^{} \end{bmatrix} + \begin{bmatrix} \omega \cdot K_{eq} \\ \omega \cdot K_{ed} \end{bmatrix} \quad (34)$$

In the first to fourth embodiments, the AC currents $i_u$, $i_v$, $i_w$, which are directly detected by the current detector 4, are applied, however, from the DC current flowing through one shunt resistor attached for overcurrent detection of the power converter 2, $\hat{i_u}$, $\hat{i_v}$, $\hat{i_w}$ may be reproduced and applied.

Furthermore, in the first to fourth embodiments, the position $\theta_{dc}$ detected by the encoder, resolver, magnetic pole position sensor, or the like capable of detecting the positional information about the magnet motor 1 is used. However, the present invention can be applied also to a position-sensorless method.

Based on the voltage command values $V_{dc}^*$, $V_{qc}^*$, the current detection values $I_{dc}$, $I_{qc}$ and the constants of the motor, the phase error $\Delta\theta_c$, which is the deviation between the phase command value and the motor phase value, is calculated according to Formula (35).

$$\Delta\theta_c = \tan^{-1}\left[\frac{V_{dc}^* - R^* \cdot I_{dc} + \omega' \cdot L_q^* \cdot I_{qc}}{V_{qc}^* - R^* \cdot I_{qc} + \omega' \cdot L_q^* \cdot I_{dc}}\right] \quad (35)$$

Next, a frequency estimation value $\omega'$ is controlled so as to set this signal $\Delta\theta_c$ to be "zero".

The present invention can be applied to such a position-sensorless control method.

The control apparatus for a permanent magnet motor of the present invention can be applied to general industrial permanent magnet motors.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus for a permanent magnet motor, comprising a power converter which drives the permanent magnet motor and controlling an output of the power converter, the control apparatus for a permanent magnet motor performing the steps of:
    calculating a sinusoidal superimposed signal, with the use of an induced voltage coefficient of the permanent magnet motor and information about an inductance;
    adding the sinusoidal superimposed signal to a current command value, and controlling the output voltage of the power converter; and
    controlling values of a DC torque component and ripple torque component of the permanent magnet motor.

2. The control apparatus for a permanent magnet motor according to claim 1, wherein for a ripple frequency of a torque ripple, the "DC torque component" increases by a magnitude of a half the ripple torque component of the 12th order harmonic component.

3. The control apparatus for a permanent magnet motor according to claim 1, wherein by arbitrarily setting a magnitude of the current value of the d-axis, the "ripple torque component of the 12th order harmonic component" and the "DC torque component which increases more than the torque command value" have a relationship as expressed by the following formulas:

Ripple torque component:

$$\Delta\tau_m \approx \frac{3}{2} \cdot P_m \cdot \left[\frac{1}{2} \cdot (\cos[12\theta] - \sin[12\theta]) \cdot \frac{\overline{I_d} \cdot \overline{K_{ed}^2}}{\overline{K_{ed}} + (L_d - L_q) \cdot \overline{I_d}}\right];$$

DC torque component:

$$\overline{\Delta\tau_m} \approx \frac{3}{2} \cdot P_m \cdot \left[\frac{1}{2} \cdot \frac{\overline{I_d} \cdot \overline{K_{ed}^2}}{\overline{K_{ed}} + (L_d - L_q) \cdot \overline{I_d}}\right];$$

wherein the following variables in the formulas respectively represent the following parameters:
    $\theta$: a position detection value,
    $P_m$: the number of pole pairs of a motor,
    $K_{ed}$: the induced voltage coefficient of the d-axis,
    $I_d$: the current of the d-axis,
    $L_d$: the inductance value of the d-axis, and
    $L_q$: the inductance value of the q-axis; and wherein a bar over a parameter in the formula indicates a DC component value of the parameter.

4. A control apparatus for a permanent magnet motor, comprising a power converter which drives the permanent magnet motor and controlling an output of the power converter, the control apparatus for a permanent magnet motor performing the steps of:
calculating a sinusoidal superimposed signal, with the use of ripple components of an induced voltage coefficient of a d-axis and q-axis of the permanent magnet motor, inductances of the d-axis and q-axis, and current command values of the d-axis and q-axis;
adding the sinusoidal superimposed signal to the current command value of the q-axis, and controlling the output voltage of the power converter; and
controlling values of a DC torque component and ripple torque component of the permanent magnet motor.

5. The control apparatus for a permanent magnet motor according to claim 4, wherein the "ripple component" is a signal which varies with a motor position.

6. A control apparatus for a permanent magnet motor, comprising a power converter which drives the permanent magnet motor and controlling an output of the power converter, the control apparatus for a permanent magnet motor performing the steps of:
calculating a sinusoidal superimposed signal, with the use of ripple components of an induced voltage coefficient of a d-axis and q-axis of the permanent magnet motor, inductances of the d-axis and q-axis, and current command values of the d-axis and q-axis;
adding the sinusoidal superimposed signal to the current command value of the q-axis, and controlling the output voltage of the power converter; and
controlling values of a DC torque component and ripple torque component of the permanent magnet motor;
wherein the calculation of the sinusoidal superimposed signal is performed using a ripple component of an induced voltage coefficient of at least one of the d-axis and q-axis of a rotating coordinate system, a current command value of the other axis, an average value of induced voltage coefficients of the d-axis, inductance values of the d-axis and q-axis, and a current command value of the d-axis.

7. A control apparatus for a permanent magnet motor, comprising a power converter which drives the permanent magnet motor and controlling an output of the power converter, the control apparatus for a permanent magnet motor performing the steps of:
calculating a sinusoidal superimposed signal, with the use of ripple components of an induced voltage coefficient of a d-axis and q-axis of the permanent magnet motor, inductances of the d-axis and q-axis, and current command values of the d-axis and q-axis;
adding the sinusoidal superimposed signal to the current command value of the q-axis, and controlling the output voltage of the power converter; and
controlling values of a DC torque component and ripple torque component of the permanent magnet motor;
wherein the sinusoidal superimposed signal added to the current command value of the q-axis is obtained by setting an arbitrary integer n in the following calculation formula:

$$\Delta I_q^* = \sum_{n=1}^{\infty} \left( \frac{-\Delta K_{ed}}{\overline{K_{ed}} + (L_d - L_q) \cdot I_{d0}^*} \right)^n \cdot I_{q0}^* - \sum_{n=1}^{\infty} \left( \frac{-\Delta K_{eq}}{\overline{K_{ed}} + (L_d - L_q) \cdot I_{d0}^*} \right)^n \cdot I_{d0}^*$$

wherein the following variables in the formula respectively represent the following parameters:
n: an integer,
$\Delta K_{ed}$: the "ripple component" of the induced voltage coefficient of the d-axis,
$\Delta K_{eq}$: the "ripple component" of the induced voltage coefficient of the q-axis,
$\overline{K_{ed}}$: the "DC component" of the induced voltage coefficient of the d-axis,
$I_{d0}^*$: a torque command value or a current command value of the d-axis supplied from a host, and
$I_{q0}^*$: a torque command value or a current command value of the q-axis supplied from the host.

8. A control apparatus for a permanent magnet motor, comprising a power converter which drives the permanent magnet motor and controlling an output of the power converter, the control apparatus for a permanent magnet motor performing the steps of:
estimating the output torque of the permanent magnet motor, with the use of information about a voltage and current of the power converter which drives the permanent magnet motor,
adding a sinusoidal superimposed signal, which is calculated using a deviation from the torque command value supplied from the host, to the current command value of the q-axis,
controlling the output voltage of the power converter, and
controlling values of a DC torque component and ripple torque component of the permanent magnet motor.

9. The control apparatus for a permanent magnet motor according to claim 8, wherein the method of estimating the output torque of the permanent magnet motor comprises the step of: subtracting a copper loss component, and a transitional component, from effective power information of the power converter.

10. The control apparatus for a permanent magnet motor according to claim 8, wherein the output torque estimation of the permanent magnet motor is performed according to the following calculation formula:

$$\hat{\tau} = \frac{\begin{pmatrix} V_{dc}^* \cdot I_{dc} + \\ V_{qc}^* \cdot I_{qc} \end{pmatrix} - R \cdot \begin{pmatrix} I_{dc}^2 + \\ I_{qc}^2 \end{pmatrix} - \begin{pmatrix} L_d \cdot I_{dc}^2 + \\ L_q \cdot I_{qc}^2 \end{pmatrix} \cdot s}{\omega} \cdot \frac{3}{2} \cdot P_m$$

wherein the following variables in the formula respectively represent the following parameters:
n: an integer,
$V_{dc}^*$: a voltage command value of the d-axis,
$I_{dc}^*$: a current detection value of the d-axis,
$L_d$: an inductance value of the d-axis,
$V_{qc}^*$: a voltage command value of the q-axis,
$I_{qc}$: a current detection value of the q-axis,
$L_q$: an inductance value of the q-axis,
$\omega$: an electrical angular velocity of the magnet motor,
$P_m$: the number of pole pairs, and
s: a Laplace operator.

11. The control apparatus for a permanent magnet motor according to claim 8, wherein the calculation of the sinusoidal superimposed signal added to the current command value of the q-axis comprises the steps of:

calculating a torque deviation between an estimated output torque of the permanent magnet motor and a torque command value supplied from a host, preparing a sine signal and a cosine signal, with the use of the largest each frequency component contained in a torque estimation value in one period of electric angle of a position detection value, performing a proportional/integral calculation, with the use of the cosine signal, and the torque deviation or the torque estimation value;

multiplying the resulting calculation value again by the cosine signal to obtain a first calculation result, performing a proportional/integral calculation, with the use of the sine signal, and the torque deviation or the torque estimation value;

multiplying the resulting calculation value again by the sine signal to obtain a second calculation result, and adding a value, which is obtained by doubling an added value of the first calculation result and the second calculation result, to the current command value of the q-axis supplied from the host.

12. The control apparatus for a permanent magnet motor according to claim 8, the control apparatus for a permanent magnet motor performing the steps of:

setting a plurality of angular frequency components contained in the torque estimation value;

preparing a plurality of sine signals and cosine signals;

performing a proportional/integral calculation, with the use of the plurality of cosine signals, and torque deviations or torque estimation values, respectively;

multiplying each resulting calculation value again by the plurality of cosine signals to obtain a third calculation result;

performing a proportional/integral calculation, with the use of the plurality of sine signal, and the torque deviation or the torque estimation value, respectively;

multiplying the resulting calculation value again by the plurality of sine signals to obtain a fourth calculation result; and adding a value, which is obtained by doubling an added value of the third calculation result and the fourth calculation result, to the current command value of the q-axis supplied from the host.

* * * * *